(12) United States Patent
Mizuno

(10) Patent No.: US 10,951,789 B2
(45) Date of Patent: Mar. 16, 2021

(54) NON-TRANSITORY COMPUTER-READABLE RECORDING MEDIUM STORING COMPUTER-READABLE INSTRUCTIONS FOR INFORMATION PROCESSING DEVICE, INFORMATION PROCESSING DEVICE, AND METHOD PERFORMED BY INFORMATION PROCESSING DEVICE FOR MANAGEMENT OF COLORANT MATERIAL AMOUNTS IN PLURAL TYPES OF PRINTERS HAVING DIFFERENT METHODS FOR SUPPLYING COLORANT MATERIALS

(71) Applicant: BROTHER KOGYO KABUSHIKI KAISHA, Nagoya (JP)

(72) Inventor: Akiko Mizuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/829,625

(22) Filed: Mar. 25, 2020

(65) Prior Publication Data
US 2020/0314291 A1 Oct. 1, 2020

(30) Foreign Application Priority Data

Mar. 28, 2019 (JP) .............................. JP2019-064123

(51) Int. Cl.
*H04N 1/23* (2006.01)
*H04N 1/32* (2006.01)
*B41J 2/175* (2006.01)

(52) U.S. Cl.
CPC ....... *H04N 1/2346* (2013.01); *H04N 1/32523* (2013.01); *B41J 2/17566* (2013.01); *B41J 2002/17589* (2013.01)

(58) Field of Classification Search
CPC combination set(s) only.
See application file for complete search history.

(56) References Cited

U.S. PATENT DOCUMENTS

| 6,330,402 B1 | 12/2001 | Sakurai et al. |
| 7,283,258 B1 | 10/2007 | Kuno et al. |
| (Continued) | | |

FOREIGN PATENT DOCUMENTS

| JP | 2000-071568 A | 3/2000 |
| JP | 2001-083846 A | 3/2001 |
| (Continued) | | |

*Primary Examiner* — Barbara D Reinier
(74) *Attorney, Agent, or Firm* — Scully, Scott, Murphy & Presser, PC

(57) ABSTRACT

An information processing device may notify first notification information in a case where a remaining amount of colorant in a first-type printer reaches a first remaining amount, notify second notification information in a case where the remaining amount reaches an unprintable remaining amount, notify third notification information in a case where a remaining amount of colorant in a second-type printer reaches a second remaining amount, and notify fourth notification information in a case where the remaining amount reaches the unprintable remaining amount. The first-type printer may include a tank for storing colorant supplied from a first cartridge to a first print executing unit. The first remaining amount may be a remaining amount in a state where the colorant does not remain in the first cartridge but remains in the tank. The second-type printer may include a second print executing unit and may not include a tank.

20 Claims, 12 Drawing Sheets

(56) References Cited

U.S. PATENT DOCUMENTS

| | | | |
|---|---|---|---|
| 8,582,988 B2* | 11/2013 | Rapkin | G03G 15/5079 |
| | | | 399/24 |
| 10,089,052 B2* | 10/2018 | Abe | G06F 3/1285 |
| 10,434,789 B2* | 10/2019 | Horade | B41J 2/2103 |
| 10,696,074 B2* | 6/2020 | Mizuno | H04N 1/00477 |
| 10,712,701 B2* | 7/2020 | Nogawa | G03G 15/0879 |
| 2003/0231331 A1 | 12/2003 | Tanaka | |
| 2010/0074633 A1 | 3/2010 | Kuwasaki | |
| 2015/0316884 A1 | 11/2015 | Shinagawa | |
| 2020/0324563 A1* | 10/2020 | Mizuno | H04N 1/00477 |
| 2020/0341421 A1* | 10/2020 | Nogawa | G03G 15/553 |

FOREIGN PATENT DOCUMENTS

| | | | | |
|---|---|---|---|---|
| JP | 2004-005088 A | | 1/2004 | |
| JP | 2018-092198 A | | 6/2018 | |
| JP | 2019197408 A | * | 11/2019 | G06F 3/1229 |
| JP | 2010-079575 A | | 4/2020 | |

* cited by examiner

Communication System 2

FIG. 5

- Total Remaining Rate of Sub-tank Model 100 × RE / TO
- Total Remaining Rate of CTG Model 100 × RE / TO

- CTG Remaining Rate of Sub-tank Model
  (In a case of RE > TA) 100 × (RE − TA) / (TO − TA)
  (In a case of RE ≦ TA) 0
- CTG Remaining Rate of CTG Model 100 × RE / TO

- Tank Remaining Rate of Sub-tank Model
  (In a case of RE > TA) 100
  (In a case of RE ≦ TA) 100 × RE / TA Management Database 40

| Printer Name | Model Name | Ink Supply Model | Number of Total Sheets TO | Number of Tank Sheets TA | Number of Remaining Sheets RE | Total Remaining Rate | CTG Remaining Rate | Tank Remaining Rate |
|---|---|---|---|---|---|---|---|---|
| Pa | Ma | sub tank | TOa | TAa | REa | 60 | 55 | 100 |
| Pb | Mb | sub tank | TOb | TAb | REb | 0 | 0 | 0 |
| Pc | Mc | CTG | TOc | – | REc | 80 | 80 | – |
| ... | ... | ... | ... | ... | ... | ... | ... | ... |

| Low Notification Flag | Empty CTG Notification Flag | Unprintability Notification Flag | Low Finished Flag | Empty CTG Finished Flag | Unprintability Finished Flag | Low Notification Address | Empty Notification Address |
|---|---|---|---|---|---|---|---|
| ON (20%) | ON | ON | ON | OFF | OFF | address1 | address2 |
| ON (20%) | ON | ON | ON | ON | ON | address1 | address2 |
| ON (20%) | – | ON | OFF | – | OFF | address1 | address2 |
| ... | ... | ... | ... | ... | ... | ... | ... |

FIG. 11

(Second Embodiment)
S62 in FIG. 6: Check both Low Notification and Empty Notification
· Sub-tank Model
in a case of Total Remaining Rate (with Number of Tank Sheets = Number of Remaining Sheets) > Low Notification Remaining Rate
→Empty CTG Notification Flag = ON (Low Notification Flag = OFF), Unprintability Notification Flag = OFF
in a case of Total Remaining Rate (with Number of Tank Sheets = Number of Remaining Sheets) ≤ Low Notification Remaining Rate
→Low Notification Flag = ON (Empty CTG Notification Flag = OFF), Unprintability Notification Flag = OFF
· CTG Model
→Low Notification Flag = ON, Unprintability Notification Flag = ON

Printer 100a

Number of Total Sheets = 1000, Number of Tank Sheets = 100
(Total Remaining Rate 10% (with Number of Tank Sheets = Number of Remaining Sheets ≤ Low Notification Remaining Rate 20 %)

Number of Remaining Sheets = 1000
(Total Remaining Rate = 100%,
CTG Remaining Rate = 100%,
Tank Remaining Rate = 100 %)

→ Number of Remaining Sheets = 200
(Total Remaining Rate = 20%,
CTG Remaining Rate = 11%,
Tank Remaining Rate = 100 %)
Low Notification Information (to Vender of CTG)

→ Number of Remaining Sheets = 0
(Total Remaining Rate = 0%,
CTG Remaining Rate = 0%,
Tank Remaining Rate = 0 %)
Unprintability Notification Information (to Administrator of Printers)

Printer 100b

Number of Total Sheets = 1200, Number of Tank Sheets = 300
(Total Remaining Rate 25% (with Number of Tank Sheets = Number of Remaining Sheets > Low Notification Remaining Rate 20 %)

Number of Remaining Sheets = 1200
(Total Remaining Rate = 100%,
CTG Remaining Rate = 100%,
Tank Remaining Rate = 100 %)

→ Number of Remaining Sheets = 300
(Total Remaining Rate = 25%,
CTG Remaining Rate = 0%,
Tank Remaining Rate = 100 %)
Empty CTG Notification Information (to Administrator of Printers)

→ Number of Remaining Sheets = 0
(Total Remaining Rate = 0%,
CTG Remaining Rate = 0%,
Tank Remaining Rate = 0 %)
Unprintability Notification Information (to Administrator of Printers)

Printer 100c

Number of Total Sheets = 800

→ Number of Remaining Sheets = 800
(Total Remaining Rate = 100%,
CTG Remaining Rate = 100%)

→ Number of Remaining Sheets = 160
(Total Remaining Rate = 20%,
CTG Remaining Rate = 20%)
Low Notification Information (to Vender of CTG)

→ Number of Remaining Sheets = 0
(Total Remaining Rate = 0%,
CTG Remaining Rate = 0%)
Unprintability Notification Information (to Administrator of Printers)

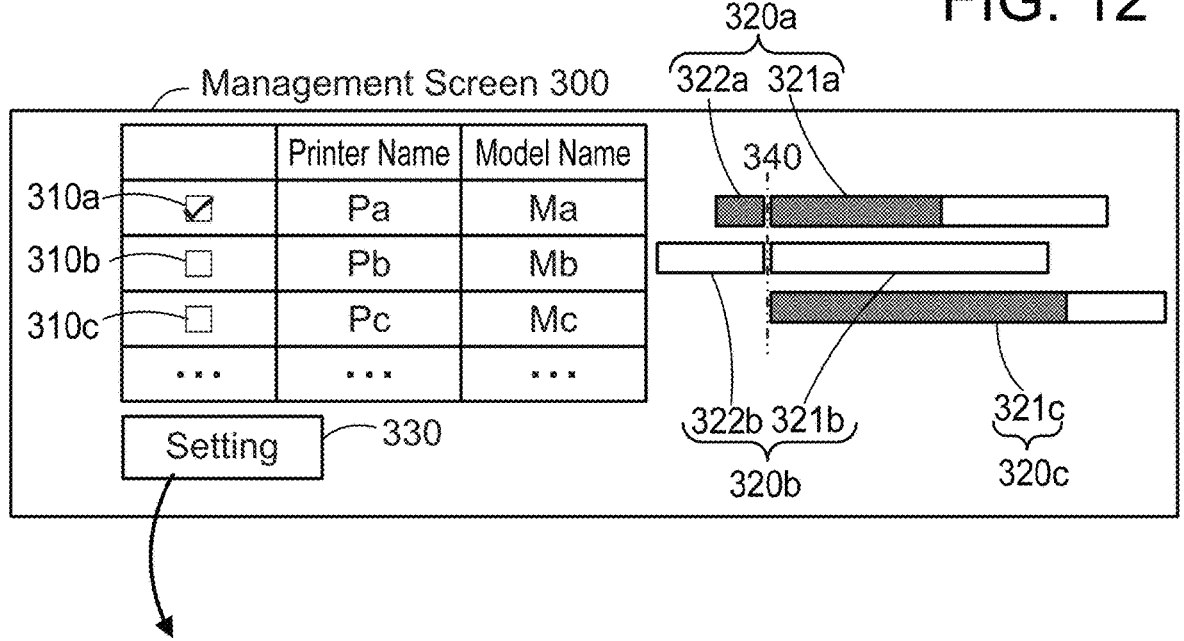
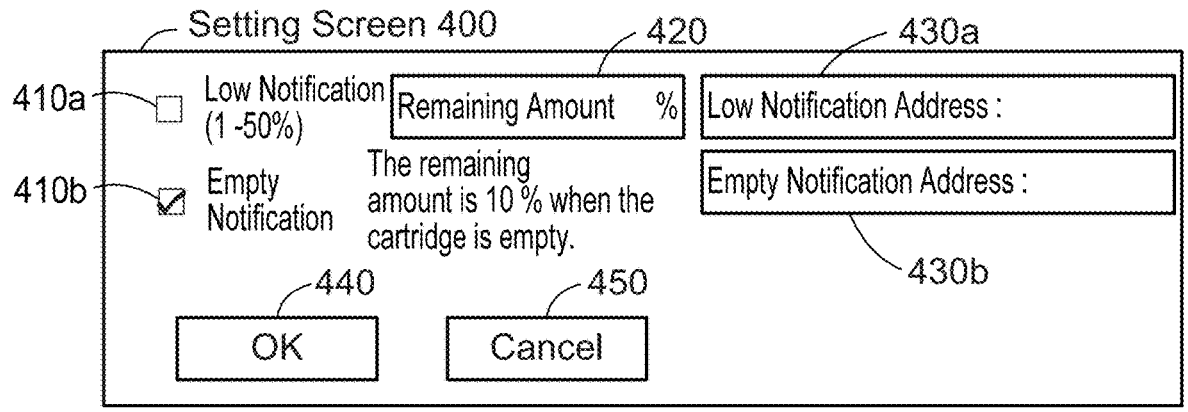
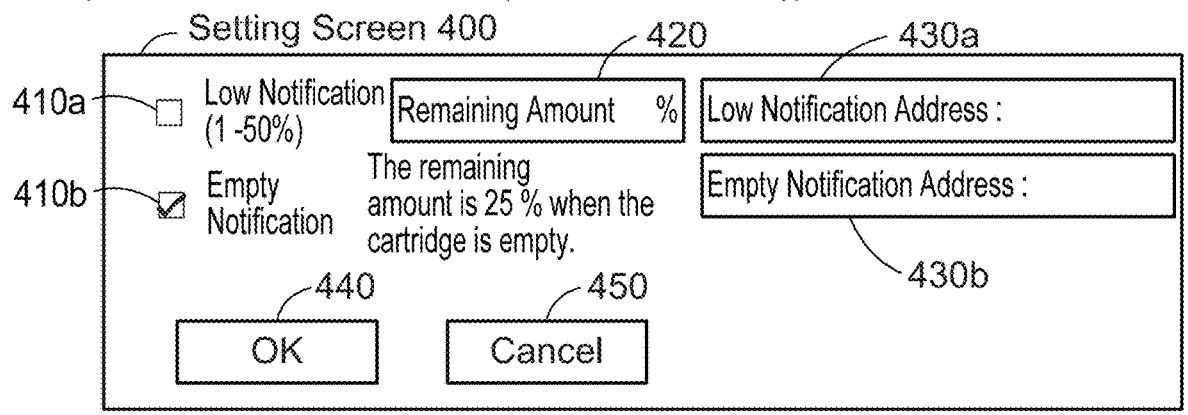
FIG. 12

NON-TRANSITORY COMPUTER-READABLE RECORDING MEDIUM STORING COMPUTER-READABLE INSTRUCTIONS FOR INFORMATION PROCESSING DEVICE, INFORMATION PROCESSING DEVICE, AND METHOD PERFORMED BY INFORMATION PROCESSING DEVICE FOR MANAGEMENT OF COLORANT MATERIAL AMOUNTS IN PLURAL TYPES OF PRINTERS HAVING DIFFERENT METHODS FOR SUPPLYING COLORANT MATERIALS

CROSS-REFERENCE TO RELATED APPLICATION

This application claims priority to Japanese Patent Application No. 2019-064123, filed on Mar. 28, 2019, the entire contents of which are incorporated herein by reference.

TECHNICAL FIELD

The present disclosure discloses a technique relating to an information processing device configured to acquire remaining amount information related to a remaining amount of colorant in a printer.

BACKGROUND

An image forming device is known that displays a display screen including a gauge showing a remaining amount of toner in a small-capacity cartridge, and a gauge showing a remaining amount of toner in a large-capacity cartridge.

SUMMARY

In the aforementioned technique, there is no assumption that a plurality of types of printers which have different methods for supplying toner to a developing means exist.

The present disclosure discloses a technique that is able to appropriately execute a notification related to a remaining amount of colorant in each of a first-type printer and a second-type printer, in a case where the first-type printer and the second-type printer that have different methods for supplying colorant to a print executing unit exist.

A non-transitory computer-readable recording medium storing computer-readable instructions for an information processing device is disclosed. The computer-readable instructions, when executed by a processor of the information processing device, may cause the information processing device to: acquire first remaining amount information related to a remaining amount of colorant in a first-type printer from the first-type printer, wherein the first-type printer comprises a first print executing unit and a tank configured to store colorant supplied from a first cartridge to the first print executing unit; acquire second remaining amount information related to a remaining amount of colorant in a second-type printer from the second-type printer different from the first-type printer, wherein the second-type printer comprises a second print executing unit and does not comprise a tank configured to store colorant supplied from a second cartridge to the second print executing unit, and each of the first-type printer and the second-type printer shifts from a printable state to an unprintable state in a case where the remaining amount of colorant in the printer reaches an unprintable remaining amount; in a case where the acquired first remaining amount information indicates that the remaining amount of colorant in the first-type printer reaches a first remaining amount which is greater than the unprintable remaining amount, notify first notification information indicating that the remaining amount of colorant in the first-type printer reaches the first remaining amount, wherein the first remaining amount is a remaining amount in a state where the colorant does not remain in the first cartridge but remains in the tank; in a case where the acquired first remaining amount information indicates that the remaining amount of colorant in the first-type printer reaches the unprintable remaining amount, notify second notification information indicating that the remaining amount of colorant in the first-type printer reaches the unprintable remaining amount: in a case where the acquired second remaining amount information indicates that the remaining amount of colorant in the second-type printer reaches a second remaining amount which is greater than the unprintable remaining amount, notify third notification information indicating that the remaining amount of colorant in the second-type printer reaches the second remaining amount; and in a case where the acquired second remaining amount information indicates that the remaining amount of colorant in the second-type printer reaches the unprintable remaining amount, notify fourth notification information indicating that the remaining amount of colorant in the second-type printer reaches the unprintable remaining amount.

An information processing device realized by the above computer-readable instructions, and a method executed by the information processing device are also novel and useful. Further, a system comprising the information processing device and each of the first-type and second-type printers is also novel and useful.

BRIEF DESCRIPTION OF DRAWINGS

FIG. 5 shows an example of a management database;
FIG. 11 is an explanatory diagram for describing a second embodiment;
and
FIG. 12 shows an example of a setting screen of a third embodiment.

DETAILED DESCRIPTION

Figure 1:
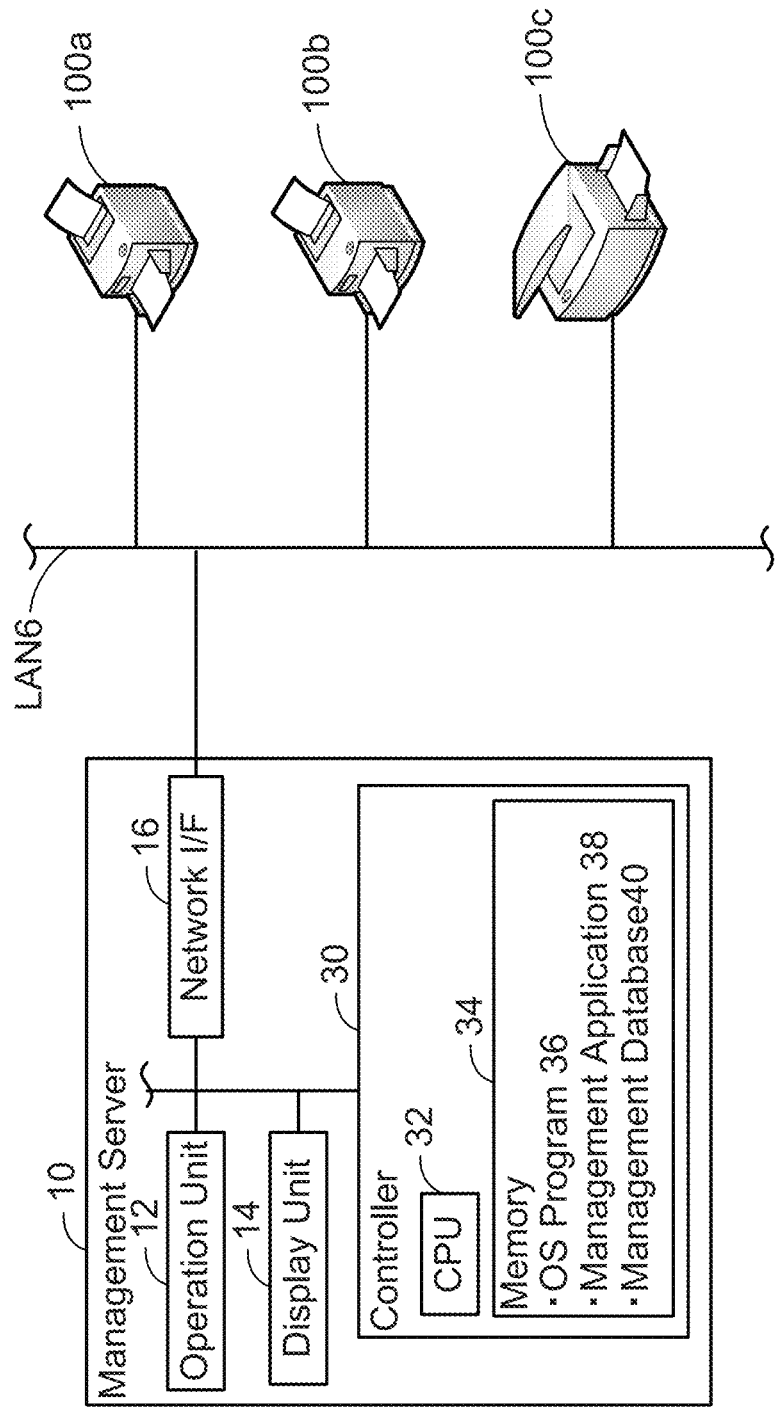
FIG. 1 shows a configuration of a communication system.

First Embodiment (Configuration of Communication System 2; FIG. 1)
As shown in FIG. 1, a communication system 2 comprises a management server 10 and a plurality of printers 100a to 100c. The management server 10 and the printers 100a, etc.

are connected to a LAN (Local Area Network) 6, and are capable of communicating with one another via the LAN 6. The LAN 6 may be a wired LAN or a wireless LAN.

(Configuration of Management Server 10)

The management server 10 acquires information from each of the printers 100a, etc. and manages these pieces of information. In particular, the management server 10 has a function of notifying that remaining amounts of ink in the printer 100a, etc. are low. The management server 10 comprises an operation unit 12, a display unit 14, a network interface 16, and a controller 30.

The operation unit 12 comprises a keyboard and a mouse operated by a user. The display unit 14 is a display for displaying various types of information. The network interface 16 is connected to the LAN 6. The LAN 6 may be a wireless LAN, or may be a wired LAN. The controller 30 comprises a CPU 32 and a memory 34. The CPU 32 executes various processes in accordance with programs 36, 38 stored in the memory 34. The memory 34 is constituted of a volatile memory, a non-volatile memory, and the like.

The OS program 36 is a program for realizing basic processes of the management server 10. The management application 38 is a program for acquiring printer information related to each printer of the plurality of printers 100a to 100c from the printers 100a to 100c, and executing a process using the printer information. The management application 38 is, e.g., installed on the management server 10 from a medium shipped together with each of the printers 100a, etc. The memory 34 further comprises a management database 40. Contents of the management database 40 will be described later. Below, the management database 40 is termed "management DB 40".

(Configuration of Printers 100a to 100c (FIG. 2))

The printers 100a to 100c are each a peripheral device (that is, a peripheral device of a PC for example, not shown) capable of executing a print function. The printers 100a, etc. may each be a multi-function peripheral capable of executing a scan function, copy function. FAX function, etc. in addition to the print function.

Figure 2:
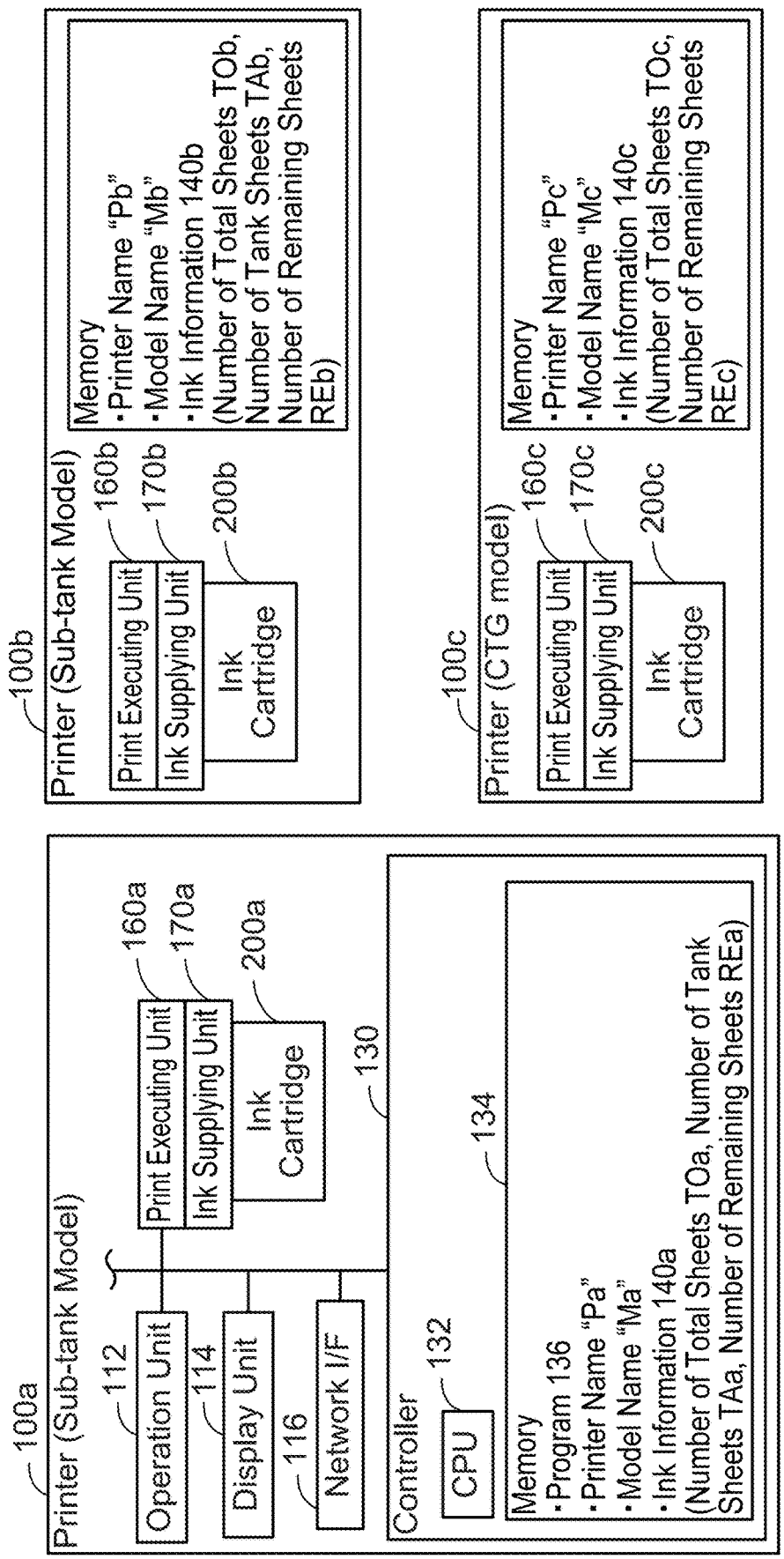
FIG. 2 shows configurations of printers.

As shown in FIG. 2, the printer 100a comprises an operation unit 112, a display unit 114, a network interface 116, a controller 130, a print executing unit 160a, and an ink supplying unit 170a.

The operation unit 112 comprises a plurality of keys operated by the user. The display unit 114 is a display for displaying various types of information. The network interface 116 is connected to the LAN 6. The controller 130 comprises a CPU 132 and a memory 134. The CPU 132 executes various processes in accordance with a program 136 stored in the memory 134. The memory 134 is constituted of a volatile memory, a non-volatile memory, and the like. The print executing unit 160a comprises an ink jet scheme printing mechanism. In the present embodiment, the print executing unit 160a is a monochrome printing mechanism that executes printing using one color of ink (e.g., black (K)). An ink cartridge 200a is mounted in the ink supplying unit 170a. The ink supplying unit 170a supplies the ink from the ink cartridge 200a to the print executing unit 160a. Below, ink cartridge may be termed "CTG (Cartridge)".

The memory 134 further stores a printer name "Pa", a model name "Ma", and ink information 140a. The printer name "Pa" is a name assigned to the printer 100a. The model name "Ma" is a name indicating a model of the printer 100a. The ink information 140a is information related to a remaining ink amount in the printer 100a, and includes a number of total sheets TOa, a number of tank sheets TAa. and a number of remaining sheets REa. Contents of the ink information 140a will be described later.

The other printers 100b. 100c each comprise the same configuration as the printer 100a except that they respectively comprise ink supplying units 170b. 170c different from the ink supplying unit 170a of the printer 100a. In FIG. 2, some components (e.g., operation unit, display unit etc.) of the printers 100b. 100c are not shown.

The printer 100b comprises a print executing unit 160b, an ink supplying unit 170b in which a CTG 200b is mounted, and a memory in a controller (reference number omitted). The memory stores a printer name "Pb", a model name "Mb", and ink information 140b. As with the ink information 140a of the printer 100a, the ink information 140b includes a number of total sheets TOb, a number of tank sheets TAb. and a number of remaining sheets REb.

The printer 100c comprises a print executing unit 160c, an ink supplying unit 170c in which a CTG 200c is mounted, and a memory in a controller (reference number omitted). The memory stores a printer name "Pc", a model name "Mc", and ink information 140c. The ink information 140c includes a number of total sheets TOc and a number of remaining sheets REc, but does not include a number of tank sheets.

Figure 3A:
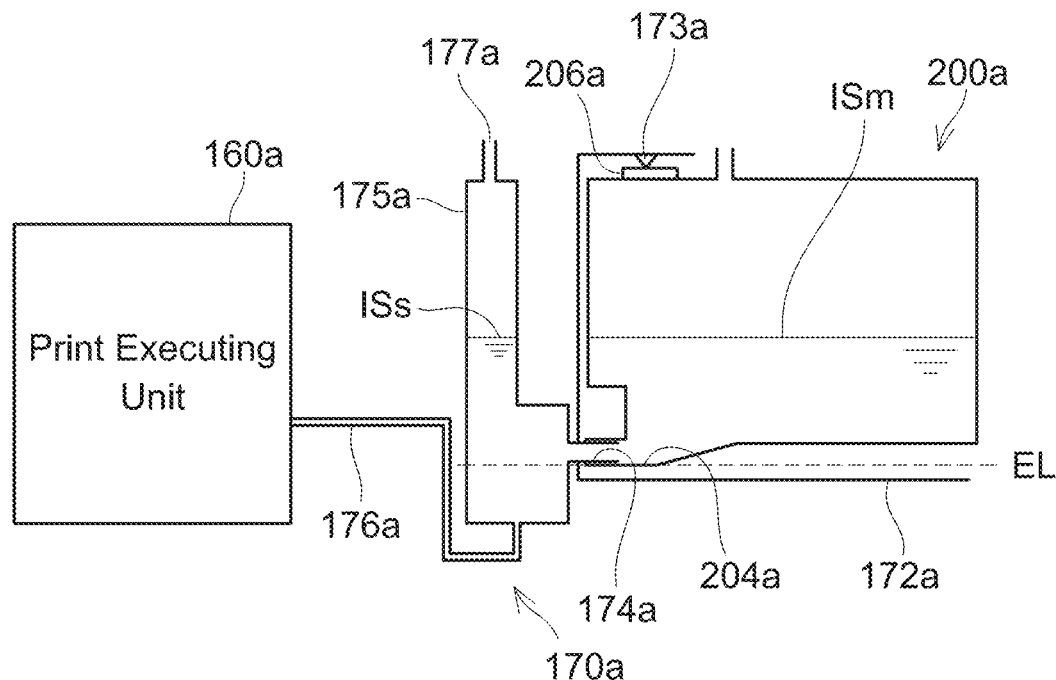
FIG. 3A shows a configuration of an ink supplying unit of a sub-tank model printer.
Figure 3B:
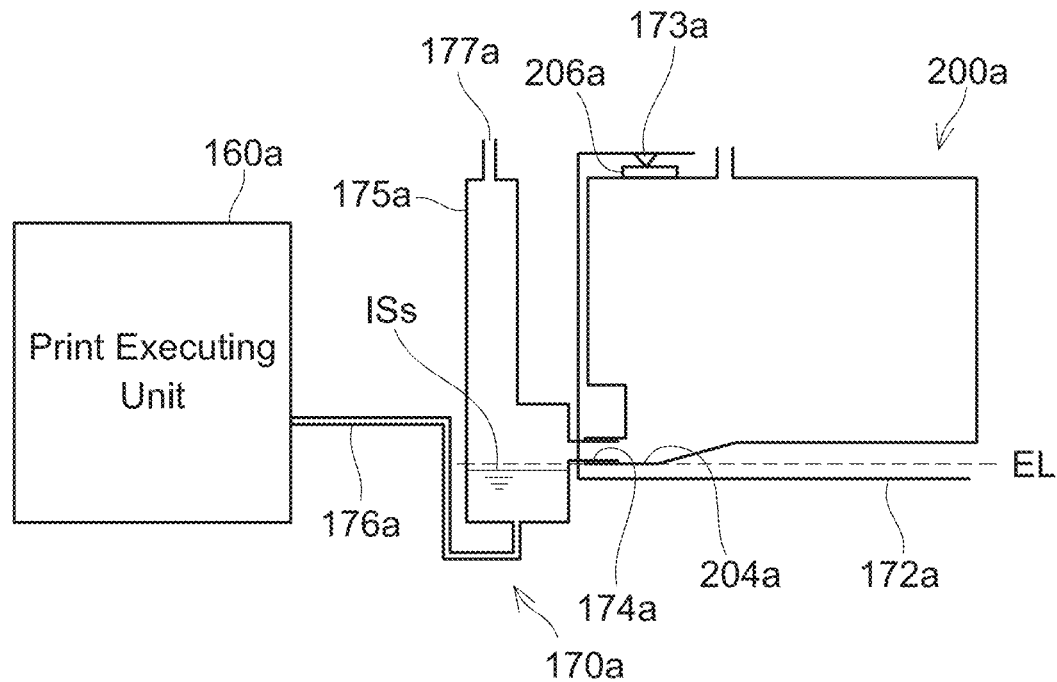
FIG. 3B shows a configuration of an ink supplying unit of a sub-tank model printer.

(Configuration of Ink Supplying Unit 170a of Printer 100a; FIG. 3A and FIG. 3B)

Next, a configuration of the ink supplying unit 170a of the printer 100a will be described with reference to FIG. 3A and FIG. 3B. As shown in FIG. 3A, the ink supplying unit 170a comprises an installment part 172a, an ink supply port 174a, a sub-tank 175a, and an ink flow path 176a.

The installment part 172a is a holder to which the CTG 200a is removably mounted. The ink supply port 174a is connected to an ink outlet port 204a of the CTG 200a mounted on the installment part 172a. The ink outlet port 204a is provided near a bottom surface of the CTG 200a. The sub-tank 175a stores ink supplied from the CTG 200a to the print executing unit 160a. The sub-tank 175a comprises a communication port 177a provided at an upper surface of the sub-tank 175a. The communication port 177a communicates between an interior and an exterior of the sub-tank 175a. One end of the ink flow path 176a is connected with the sub-tank 175a at a bottom surface of the sub-tank 175a. Another end of the ink flow path 176a is connected with the print executing unit 160a.

Since the ink supplying unit 170a comprises the above configuration, ink within the CTG 200a is supplied to the sub-tank 175a via the ink outlet port 204a and the ink supply port 174a. Then, the ink within the sub-tank 175a is supplied to the print executing unit 160a via the ink flow path 176a. Below, a printer (e.g., 100a) comprising this type of sub-tank (e.g., 175a) is called a "sub-tank model printer". Further, a printer not comprising a sub-tank is called a "cartridge model (i.e., CTG model) printer".

When a new CTG 200a is mounted in the installment part 172a, a part of the ink in the CTG 200a moves into the sub-tank 175a. Then, a height of a liquid level ISm of the ink in the CTG 200a matches a height of a liquid level ISs of the ink in the sub-tank 175a (see FIG. 3A). Thereafter, when the ink is consumed by printing being executed by the print executing unit 160a, the liquid levels ISm. ISs fall while the liquid levels ISm. ISs maintain a matching height. Then, when the liquid levels ISm. ISs reach a position EL (hereinbelow termed "empty level EL") at a lower end of the CTG 200a, the ink in the CTG 200a reaches a non-remaining state (see FIG. 3B). Here, the ink in the CTG 200a being in the non-remaining state means a state in which there is no longer movement of the ink from the CTG 200a to the sub-tank 175a, and includes a state in which some ink adheres to an inner surface of the CTG 200a. In the sub-tank model printer 100a, the CTG 200a can be replaced when the ink in the CTG 200a is in the non-remaining state, therefore the ink is not wasted.

In a case where the ink is remaining in the sub-tank 175a although the ink is not remaining in the CTG 200a, the print executing unit 160a can continue printing. Then, when the ink in the sub-tank 175a reaches a non-remaining state without the CTG 200a being replaced, the printer 100a shifts from a printable state to an unprintable state.

Further, the installment part 172a comprises a contact point 173a that makes contact with an IC chip 206a of the CTG 200a. The CPU 132 of the printer 100a is able to read information in the IC chip 206a via the contact point 173a. This information includes the number of total sheets TOa. The number of total sheets TOa is a number of sheets that can be printed using the ink amount stored in a new CTG 200a (hereinbelow termed "initial amount"). The number of total sheets TOa is obtained by dividing the initial amount by a unit ink amount. The unit ink amount is an average ink amount used for printing one sheet of print material.

Here, the ink amount in the sub-tank 175a when shifting from the state of FIG. 3A to the state of FIG. 3B is called "a boundary ink amount". That is, the boundary ink amount is the ink amount in the sub-tank 175a when the liquid level ISm of the ink in the CTG 200a reaches the empty level EL. In other words, the boundary ink amount is a maximum ink amount that can be stored in the sub-tank 175a when the ink in the CTG 200a is zero. Further, hereinbelow, the number of sheets that can be printed using the boundary ink amount is called "a number of tank sheets". The boundary ink amount and the number of tank sheets depend on structure and size of the sub-tank. The number of tank sheets TAa of the printer 100a is obtained by dividing the boundary ink amount of the printer 100a by the unit ink amount.

As described above, upon reading the number of total sheets TOa from the CTG 200a, the CPU 132 of the printer 100a stores the number of total sheets TOa in the memory 134 (see FIG. 2). Further, the memory 134 of the printer 100a stores the number of tank sheets TAa in advance (see FIG. 2). Further, the number of remaining sheets REa stored in the memory 134 (see FIG. 2) is the number of sheets of print material that can be printed using the ink remaining in the CTG 200a and the sub-tank 175a, and is obtained by subtracting a cumulative number of printed sheets from the number of total sheets TOa. The cumulative number of printed sheets is the number of sheets of print material for which printing was executed after replacement of the CTG 200a. Each time printing is executed by the print executing unit 160a, the CPU 132 calculates a new number of remaining sheets REa by subtracting the cumulative number of printed sheets from the number of total sheets TOa, and stores the new number of remaining sheets REa in the memory 134 in place of the old number of remaining sheets REa.

(Configuration of Ink Supplying Unit 170b of Printer 100b)

The printer 100b is a sub-tank model printer, like the printer 100a. However, the ink supplying unit 170b of the printer 100b is different from the ink supplying unit 170a of the printer 100a.

Specifically, first, a size of an interior space of the CTG 200b that can be mounted in the ink supplying unit 170b is different from a size of an interior space of the CTG 200a. Consequently, an initial amount of ink in the CTG 200b is different from the initial amount of ink in the CTG 200a. For this reason, the number of total sheets TOb of the printer 100b (see FIG. 2) is different from the number of total sheets TOa of the printer 100a. In the present embodiment, the number of total sheets TOb is greater than the number of total sheets TOa.

Further, a size of a sub-tank (not shown) of the ink supplying unit 170b is different from a size of the sub-tank 175a of the ink supplying unit 170a. Consequently, a boundary ink amount of the printer 100b is different from the boundary ink amount of the printer 100a. For this reason, the number of tank sheets TAb (see FIG. 2) of the printer 100b is different from the number of tank sheets TAa of the printer 100a. In the present embodiment, the number of tank sheets TAb is greater than the number of tank sheets TAa.

Figure 4A:
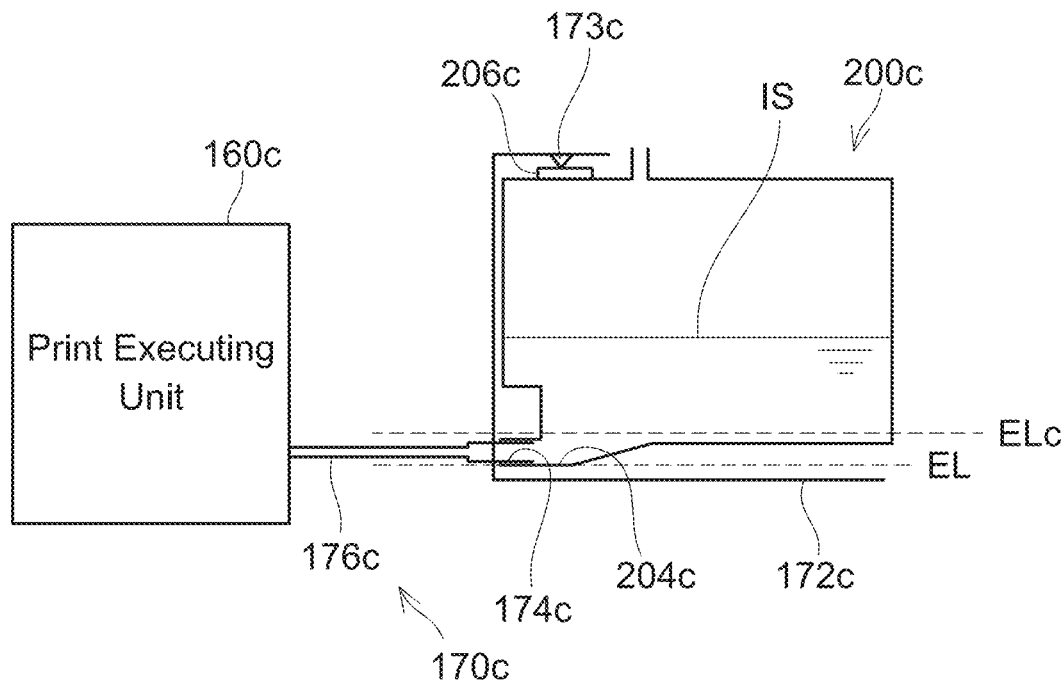
FIG. 4A shows a configuration of an ink supplying unit of a cartridge model printer.
Figure 4B:
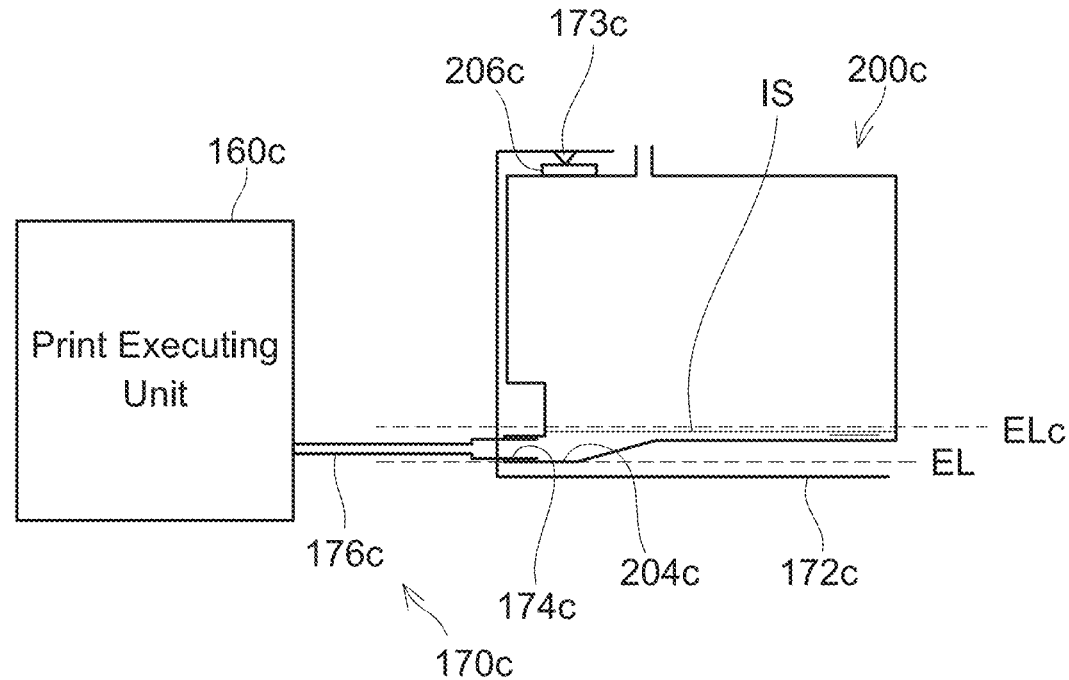
FIG. 4B shows a configuration of an ink supplying unit of a cartridge model printer.

(Configuration of Ink Supplying Unit 170c of Printer 100c; FIG. 4A and FIG. 4B)

Next, a configuration of the ink supplying unit 170c of the printer 100c will be described with reference to FIG. 4A and FIG. 4B. The printer 100c is a CTG model printer not comprising a sub-tank. As shown in FIG. 4A, the ink supplying unit 170c comprises an installment part 172c, an ink supply port 174c, and an ink flow path 176c.

The installment part 172c, the ink supply port 174c are respectively the same as the installment part 172a, the ink supply port 174a of the printer 100a (see FIG. 3A). Further, a contact point 173c is the same as the contact point 173a. Since a sub-tank does not exist, one end of the ink flow path 176c is connected with the ink supply port 174c. Another end of the ink flow path 176c is connected with the print executing unit 160c.

A size of an interior space of the CTG 200c that can be mounted in the ink supplying unit 170c is different from the size of the interior space of the CTG 200a. Consequently, an initial amount of ink in the CTG 200c is different from the initial amount of ink in the CTG 200a. For this reason, the number of total sheets TOc (see FIG. 2) of the printer 100c is different from the number of total sheets TOa of the printer 100a. In the present embodiment, the number of total sheets TOc is smaller than the number of total sheets TOa. Since a sub-tank is not provided in the printer 100c, a number of tank sheets does not exist in the printer 100c. An ink outlet port 204c, an IC chip 206c of the CTG 200c are respectively the same as the ink outlet port 204a, the IC chip 206a of the CTG 200a (see FIG. 3A).

A sub-tank is not provided in the CTG model printer 100c. For this reason, the printer 100c shifts from a printable state to an unprintable state before the ink in the CTG 200c runs out. A reason therefore is as follows. That is, when the remaining amount of ink in the CTG 200c becomes low, air can enter the ink flow path 176c connected to the print executing unit 160c, and consequently the air can be mixed into the ink supplied to the print executing unit 160c. In this case, the print executing unit 160c cannot execute printing properly. For this reason, a boundary between a remaining amount at which air does not mix with the ink and a remaining amount at which air can mix with the ink is set as an empty level ELc. That is, the empty level ELc is set to a position higher than the empty level EL at which the remaining ink amount in the CTG 200c reaches zero. FIG. 4B shows a state in which a liquid level IS of the ink in the CTG 200c has reached the empty level ELc. When this state is reached, the printer 100c shifts from the printable state to the unprintable state. When the printer 100c has shifted to the unprintable state, it is necessary to replace the CTG 200c in order to execute printing.

As described above, in the present embodiment, the sub-tank model printers 100*a*. 100*b* and the CTG model printer 100*c* exist as management target printers of the management server 10. Therefore, the management server 10 executes various notifications related to the remaining ink amounts in these models of printers. Thereby, the management server 10 can execute suitable notification depending on the model. In order to realize this, the management server 10 uses the management DB 40, which will be described next, to execute processes of FIG. 6, etc., to be described later.

(Contents of Information in Management DB 40; FIG. 5)

Next, information in the management DB 40 of the management server 10 will be described with reference to FIG. 5. The management DB 40 includes one or more pieces of management information corresponding to one or more printers. Each of the one or more pieces of management information is information in which a printer name, a model name, an ink supply model, three numbers of sheets, three remaining rates, three notification flags, three finished flags, and two notification addresses are associated with each other. The three numbers of sheets include a number of total sheets TO, a number of tank sheets TA, and a number of remaining sheets RE. The three remaining rates include a total remaining rate, a CTG remaining rate and a tank remaining rate. The three notification flags include a Low notification flag, an Empty CTG notification flag, and an Unprintability notification flag. The three finished flags include a Low finished flag, an Empty CTG finished flag, and an Unprintability finished flag. The two notification addresses include a Low notification address and an Empty notification address.

The printer name, the model name, the three numbers of sheets are acquired from each of the printers 100*a* to 100*c* and described in the management DB 40. The ink supply model is information indicating either the sub-tank model or the CTG model. In a case where the numbers of tank sheets are acquired from the printers 100*a* and 100*b*, the information indicating the sub-tank model is described in the ink supply model fields, and in a case where the number of tank sheets is not acquired from the printer 100*c*, the information indicating the CTG model is described in the ink supply model field. Further, the three remaining rates are calculated based on the three numbers of sheets and described in the management DB 40.

The total remaining rate is a remaining rate of all ink remaining in a printer. For both the sub-tank model and the CTG model, the total remaining rate is calculated by a formula "100×number of remaining sheets RE/number of total sheets TO".

The CTG remaining rate is a remaining rate of ink remaining in a CTG of a printer. In the sub-tank model, in a case where the number of remaining sheets RE>the number of tank sheets TA. i.e., in a case where the ink is remaining in the CTG, the CTG remaining rate is calculated by a formula "100×(number of remaining sheets RE−number of tank sheets TA)/(number of total sheets TO−number of tank sheets TA)". On the other hand, in a case where the number of remaining sheets RE≤the number of tank sheets TA, i.e., in a case where the ink is not remaining in the CTG, the CTG remaining rate is 0%. Further, in the CTG model, the CTG remaining rate is calculated by a formula "100× number of remaining sheets RE/number of total sheets TO". That is, in the CTG model, the CTG remaining rate is equal to the total remaining rate.

The tank remaining rate is a remaining rate of ink remaining in the sub-tank in a sub-tank model printer. In a case where the number of remaining sheets RE>the number of tank sheets TA. i.e., in a case where ink is remaining in the CTG, the tank remaining rate is 100%. On the other hand, in a case where the number of remaining sheets RE≤the number of tank sheets TA, i.e., in a case where ink is not remaining in the CTG, the tank remaining rate is calculated by a formula "100×number of remaining sheets RE/number of tank sheets TA". Since a sub-tank does not exist in a CTG model printer, the tank remaining rate field is blank.

Each of the three notification flags is set to one of a value "ON", which indicates that notification information is notified, and a value "OFF", which indicates that notification information is not notified. Each of the notification flags is set to "OFF" by default, and is changed from "OFF" to "ON" in a case where an instruction is given from the administrator of the printers 100*a* to 100*c* (i.e., the user of the management server 10).

The Low notification flag "ON" means that Low notification information is notified in a case where the total remaining rate becomes equal to or below a value designated by the administrator. The Empty CTG notification flag "ON" means that Empty CTG notification information is notified in a case where the CTG remaining rate reaches 0%. i.e., in a case where the ink in the CTG reaches the non-remaining state. Further, the Unprintability notification flag "ON" means that Unprintability notification information is notified in a case where the total remaining rate reaches 0%. i.e., in a case where the unprintable state is reached.

Each of the three finished flags is set to one of a value "ON", which indicates that the notification information has been already notified, and a value "OFF", which indicates that the notification information has not been notified yet. Each of the finished flags is set to "OFF" by default, and is changed from "OFF" to "ON" in a case where the notification information is notified after the CTG has been mounted. Further, each of the finished flags is changed from "ON" to "OFF" in a case where the CTG is replaced after the notification information has been notified.

The Low finished flag "ON" means that the Low notification information has been notified. The Empty CTG finished flag "ON" means that the Empty CTG notification information has been notified. Further, the Unprintability finished flag "ON" means that the Unprintability notification information has been notified.

In the CTG model, when the CTG remaining rate reaches 0%, the total remaining rate reaches 0%. For this reason, it is sufficient to notify only one of the Empty CTG notification information and the Unprintability notification information, and therefore, the present embodiment adopts notification of only the Unprintability notification information. Consequently, for the management information of the CTG model, the Empty CTG notification flag field and the Empty CTG finished flag field are in a blank state without being changed between "ON" and "OFF".

The Low notification address is a destination address to which an e-mail indicating the Low notification information is sent. That is, the Low notification address is a notification destination to which the Low notification information is notified. Further, the Empty notification address is a destination address to which an e-mail indicating the Empty CTG notification information and an e-mail indicating the Unprintability notification information are sent. That is, the Empty notification address is a notification destination to which the Empty CTG notification information and the Unprintability notification information are notified.

Figure 6:
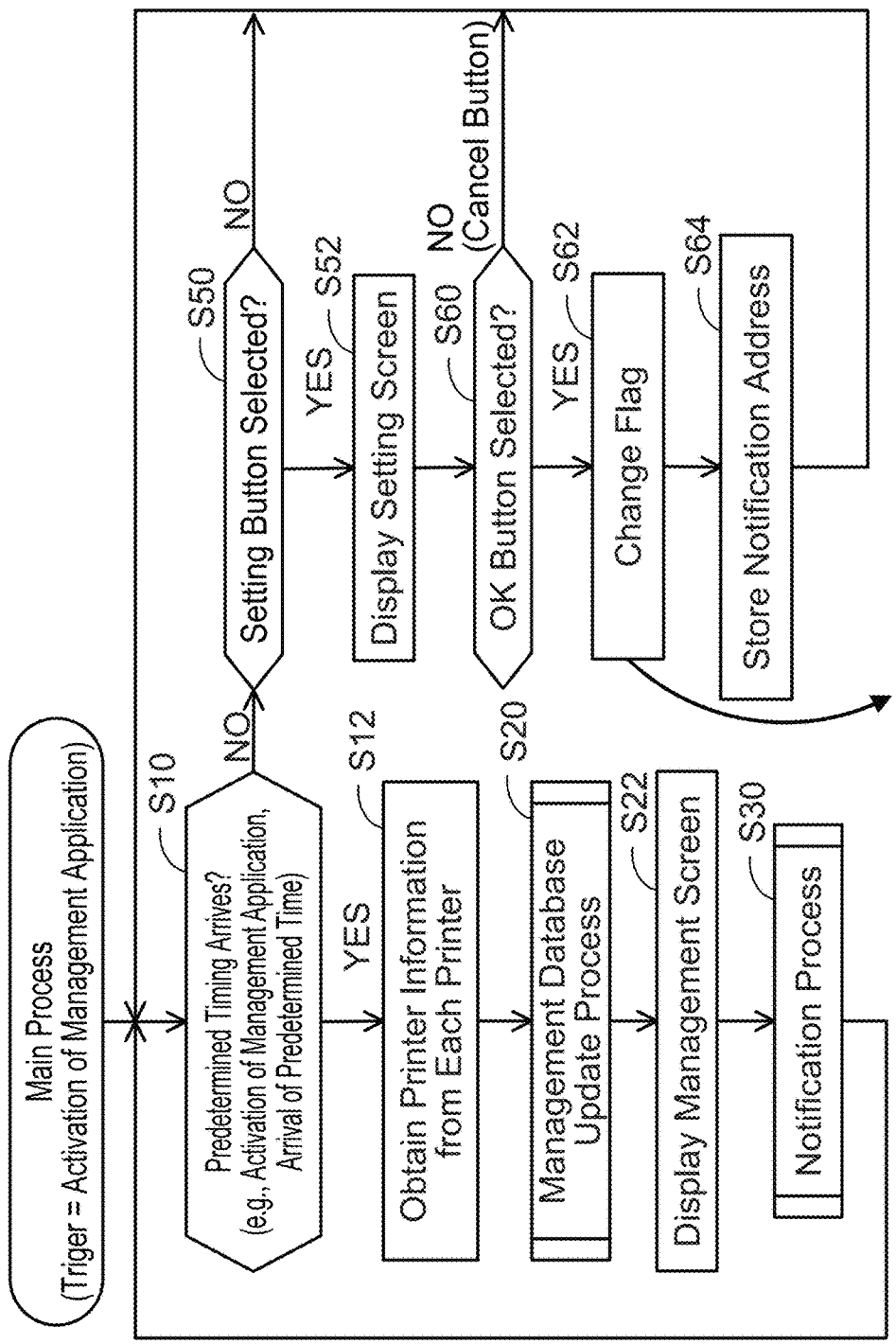
FIG. 6 shows a flowchart of a main process.

(Main Process; FIG. 6)

Next, contents of a main process executed by the CPU 32 of the management server 10 according to the management application 38 will be described with reference to FIG. 6. The CPU 32 starts the process of FIG. 6 when the management application 38 is activated by the administrator.

In S10, the CPU 32 monitors arrival of a predetermined timing. In the present embodiment, the predetermined timing includes a timing at which the management application 38 is activated, and a timing at which a predetermined time (e.g., times coming once every hour) arrives. In a variant, the predetermined timing may be a timing at which a predetermined instruction is given by the administrator. In a case where the predetermined timing arrives, the CPU 32 determines YES in S10, and proceeds to S12.

In S12, the CPU 32 acquires printer information from each of the printers 100*a* to 100*c* connected to the LAN 6. The printer information each include the printer name, model name, and ink information. Specifically, the CPU 32 sends a request signal requesting sending of the printer information by broadcast to the LAN 6. Thereby, the CPU 32 acquires the printer information by receiving the printer information from each of the printers 100*a* to 100*c* as a response to the request signal.

Figure 8:
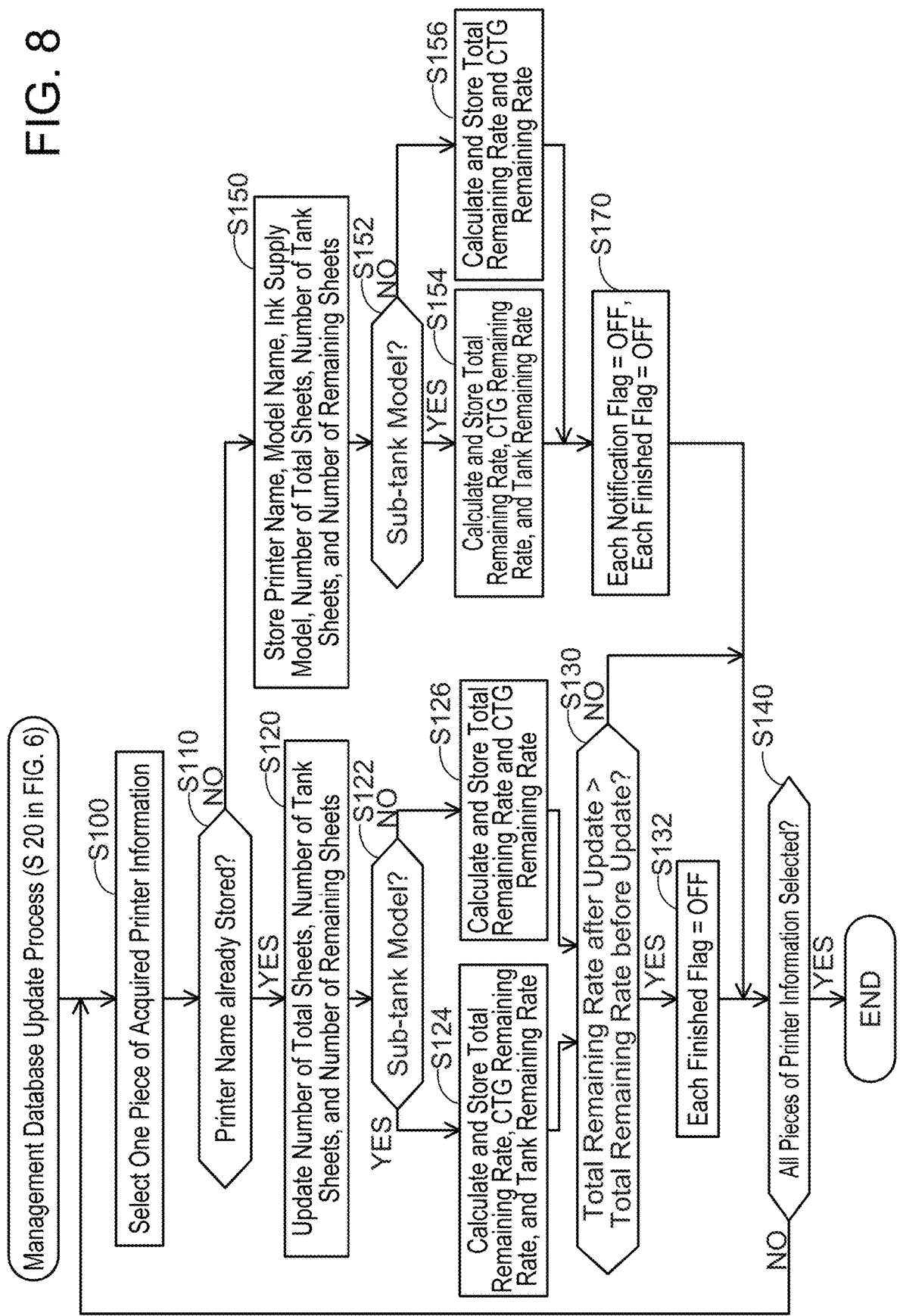
FIG. 8 shows a flowchart of a management database update process.

In S20, the CPU 32 executes a management database update process (see FIG. 8). This process is a process of updating the information in the management DB 40 using the pieces of printer information acquired in S12.

Figure 7:
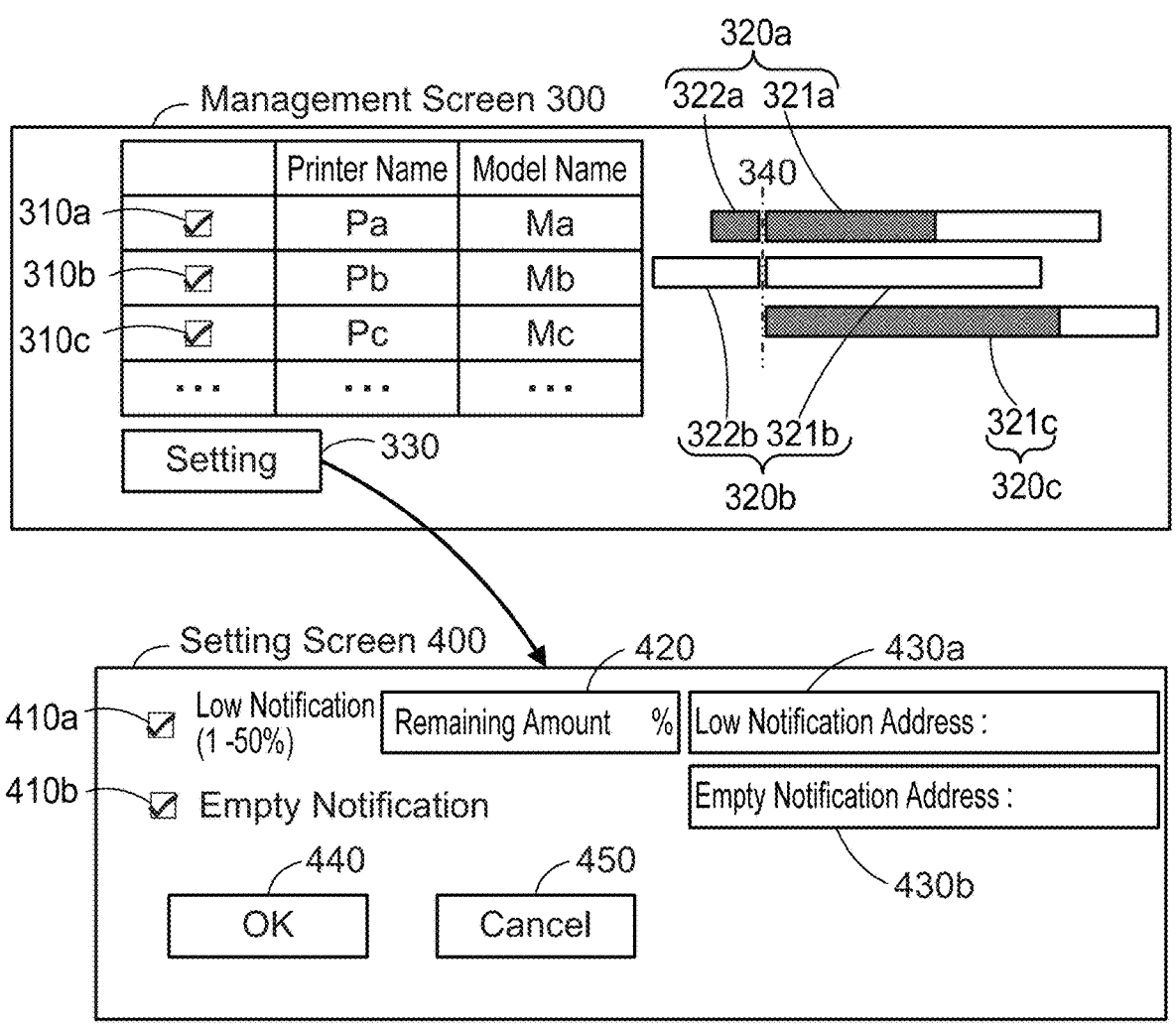
FIG. 7 shows examples of a management screen and a setting screen.

In S22, the CPU 32 displays a management screen on the display unit 14 using the information in the management DB 40 updated in S20. FIG. 7 shows an example of a management screen 300. The management screen 300 includes a printer table, remaining amount objects 320*a* to 320*c*, and a setting button 330. The setting button 330 is a button for displaying a setting screen 400.

In the printer table, check boxes 310*a* to 310*c*, the printer names and the model names are associated with each other (i.e., are arranged in a straight line). Each of the check box 310*a*, etc. is in a non-checked state (not shown) by default, and is changed to a checked state (the state shown in FIG. 7) when selected by the administrator. When the setting button 330 is selected with at least one of the check boxes 310*a*, etc. being in the checked state, the setting screen 400, which is for executing settings related to whether to notify the notification information for the printer(s) corresponding to the at least one check box, is displayed.

Each of the remaining amount objects 320*a* to 320*c* is associated with its corresponding printer name and model name (i.e., is arranged in a straight line therewith), and indicates the remaining ink amount in the associated printer. The remaining amount object 320*a* associated with the printer name "Pa" indicates the remaining ink amount in the printer 100*a*, and includes a band-shaped CTG object 321*a* indicating the remaining ink amount in the CTG 200*a* and a band-shaped tank object 322*a* indicating the remaining ink amount in the sub-tank 175*a*. In the objects 321*a* and 322*a*, a filled area indicates that the ink is remaining, and an unfilled area indicates that the ink is not remaining. Below, the former area is called "remaining area". The remaining amount object 320*a* is created based on the various types of information of the printer 100*a* in the management DB 40 (i.e., the number of total sheets TOa, the number of tank sheets TAa, the CTG remaining rate, and the tank remaining rate).

Specifically, the CPU 32 first calculates a length of the CTG object 321*a* by using a formula "standard length L×(number of total sheets TOa−number of tank sheets TAa)/number of total sheets TOa". Further, the CPU 32 calculates a length of the tank object 322*a* by using a formula "standard length L×number of tank sheets TAa/number of total sheets TOa". Next, the CPU 32 calculates a length of the remaining area of the CTG object 321*a* by using a formula "length of CTG object 321*a*×CTG remaining rate of printer 100*a*". Further, the CPU 32 calculates a length of the remaining area of the tank object 322*a* by using a formula "length of tank object 322*a*×tank remaining rate of printer 100*a*".

Next, the CPU 32 fills an area corresponding to the length of the remaining area of the CTG object 321*a* in a band-shaped rectangle object having the length of the CTG object 321*a*. Thereby, the CTG object 321*a* is completed. Further, the CPU 32 fills an area corresponding to the length of the remaining area of the tank object 322*a* in a band-shaped rectangle object having the length of the tank object 322*a*. Thereby, the tank object 322*a* is completed. Then, the CPU 32 positions the CTG object 321*a* on the right and the tank object 322*a* on the left such that a small gap is provided between the CTG object 321*a* and the tank object 322*a*. Thereby, the remaining amount object 320*a* is completed. As described above, since there is the gap in the remaining amount object 320*a*, the administrator can easily confirm that the printer 100*a* having the printer name "Pa" is the sub-tank model.

The remaining amount object 320*b* associated with the printer name "Pb" indicates the remaining ink amount in the printer 100*b*, and includes a CTG object 321*b* and a tank object 322*b*. The remaining amount object 320*b* is displayed based on the various types of information of the printer 100*b* in the management DB 40 (i.e., the number of total sheets TOb, the number of tank sheets TAb, the CTG remaining rate, and the tank remaining rate), using the same method as that for the remaining amount object 320*a*.

The remaining amount object 320*c* associated with the printer name "Pc" indicates the remaining ink amount in the printer 100*c*, and includes a CTG object 321*c*. Since the printer 100*c* is the CTG model, the remaining amount object 320*c* does not include a tank object. The CPU 32 calculates a length of a remaining area of the CTG object 321*c* by using a formula "standard length L×CTG remaining rate of printer 100*c*". Then, the CPU 32 fills an area corresponding to the length of the remaining area of the CTG object 321*c* in a band-shaped rectangle object having the standard length L. Thereby, the CTG object 321*c* (i.e., the remaining amount object 320*c*) is completed. Since a gap does not exist in the remaining amount object 320*c*, the administrator can easily confirm that the printer 100*c* having the printer name "Pc" is the CTG model.

When the CPU 32 has created the remaining amount objects 320*a* to 320*c*, the CPU 32 positions the remaining amount objects 320*a* to 320*c* such that the gaps of the remaining amount objects 320*a*, 320*b* and a left end of the remaining amount object 320*c* are positioned on a reference line 340. Since the remaining amount objects 320*a* to 320*c* are positioned as described above, the administrator can easily understand the structures and remaining ink amounts of the printers 100*a* to 100*c* in comparison with each other.

Figure 9:
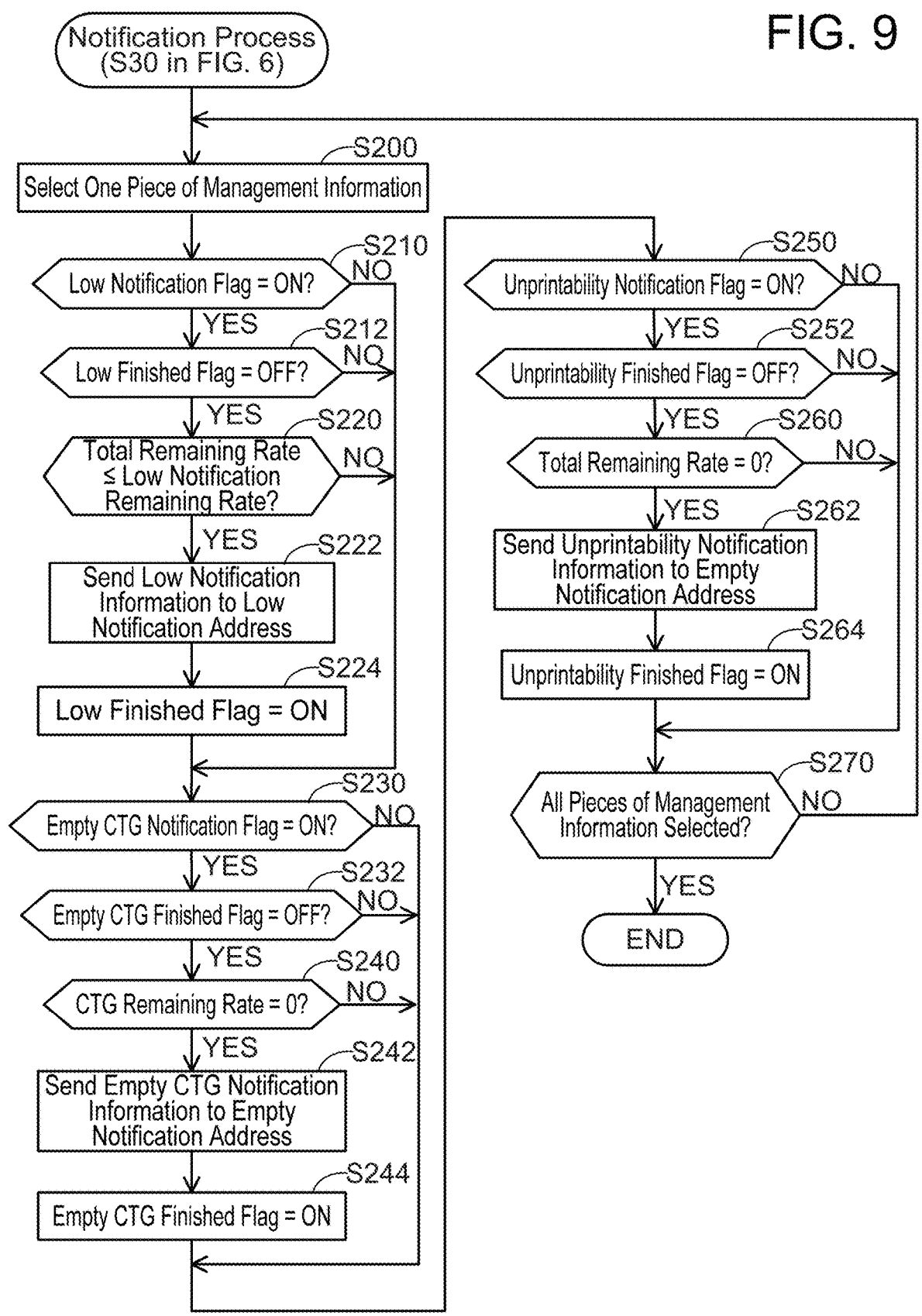
FIG. 9 shows a flowchart of a notification process.

When the management screen 300 is displayed in S22 of FIG. 6, the CPU 32 executes a notification process in S30 (see FIG. 9). The notification process is a process for notifying the notification information. When S30 ends, the process returns to the monitoring of S10.

In parallel with the monitoring of S10, the CPU 32 monitors in S50 whether the setting button 330 is selected in the management screen 300. In a case where the setting button 330 is selected, the CPU 32 determines YES in S50, and proceeds to S52.

In S52, the CPU 32 displays the setting screen on the display unit 14. FIG. 7 shows an example of the setting screen 400. The setting screen 400 is a screen for executing settings related to whether to notify the notification information for printer(s) corresponding to check box(es) in the checked state in the management screen 300 (hereinbelow termed "target printer(s)").

A check box 410a, a character string "Low notification (1 to 50%)", a remaining amount input field 420, and an address input field 430a are associated with each other (i.e., are arranged in a straight line) in the setting screen 400. Further, a check box 410b, a character string "Empty notification", and an address input field 430b are associated with each other (i.e., are arranged in a straight line) in the setting screen 400. The setting screen 400 further includes an OK button 440, and a cancel button 450.

The check boxes 410a. 410b are in the non-checked state (not shown) by default, and are changed to the checked state (the state shown in FIG. 7) when selected by the administrator. When the OK button 440 is selected with at least one of the check boxes 410a, etc. being in the checked state, at least one of the three notification flags included in the management information of each target printer in the management DB 40 is changed from "OFF" to "ON".

A desired remaining amount (i.e., remaining rate) is inputted to the remaining amount input field 420 by the administrator, with the check box 410a being in the checked state. This remaining amount is designated from among numerical ranges of 1 to 50%, and is a threshold value of the total remaining rate TO for notifying the Low notification information. That is, in a case where the total remaining rate TO of the target printer matches the remaining amount designated by the administrator, the Low notification information for the target printer is notified. Below, the remaining amount inputted to the remaining amount input field 420 is called "Low notification remaining rate". That is, in the present embodiment, the administrator can designate a Low notification remaining rate. For this reason, the management server 10 can notify the Low notification information according to a Low notification remaining rate desired by the administrator.

As described above, a Low notification remaining rate can be designated by the administrator in the setting screen 400. Here, a situation is assumed in which the setting button 330 is selected in the management screen 300 with all the three check boxes 310a to 310c being in the checked state, and then 20% is inputted as a Low notification remaining rate in the setting screen 400. In this case, the three printers 100a to 100c are each the target printer, and the Low notification information is notified for the printers 100a to 100c when their total remaining rates reach 20%. That is, the setting screen 400 is a screen for allowing the administrator to designate a Low notification remaining rate common to the plurality of sub-tank model printers 100a. 100b. Since the administrator can designate the Low notification remaining rate for both of the printers 100a, 100b at one time, the administrator can easily designate the Low notification remaining rate for the printers 100a, 100b. Further, the setting screen 400 is also a screen for allowing the administrator to designate the Low notification remaining rate common to the sub-tank model printer 100a and the CTG model printer 100c. Since the administrator can designate the Low notification remaining rate for both of the sub-tank model printer 100a and the CTG model printer 100c at one time, the administrator can easily designate the Low notification remaining rate for the printers 100a. 100c.

A desired e-mail address is inputted by the administrator into the address input field 430a as the Low notification address, with the check box 410a being in the checked state. For example, an e-mail address assigned to a CTG vendor is designated as the Low notification address. In this case, since an e-mail indicating the Low notification information is sent to the CTG vendor, the Low notification information is notified to the CTG vendor. Thereby, the CTG vendor can realize that the ink in the CTG of the target printer will soon run out, and can ship a new CTG to the administrator.

A desired e-mail address is inputted by the administrator into the address input field 430b as the Empty notification address, with the check box 410b being in the checked state. For example, an e-mail address assigned to the administrator is designated as the Empty notification address. In this case, since an e-mail indicating the Empty CTG notification information or the Unprintability notification information is sent to a terminal device of the administrator, the Empty CTG notification information or the Unprintability notification information is notified to the administrator. Thereby, the administrator can realize that the ink in the CTG of the sub-tank model target printer has run out, or that the target printer has shifted to the unprintable state, and can replace the CTG of the target printer.

As described above, a Low notification address and an Empty notification address different from the Low notification address can be designated by the administrator in the setting screen 400. For this reason, the administrator can change the notification destination of each piece of notification information, and can notify each piece of notification information to the notification destination according to its contents.

When the setting screen 400 is displayed in S52 of FIG. 6, the CPU 32 determines in S60 whether the OK button 440 in the setting screen 400 is selected. The CPU 32 determines YES in S60 and proceeds to S62 in a case where the OK button 440 is selected, while it determines NO in S60, skips S62 and S64, and returns to the monitorings of S10 and S50 in a case where the cancel button 450 is selected.

In S62, the CPU 32 changes at least one notification flag in the management DB 40. Specifically, in a case where the check box 410a (i.e., "Low notification") in the setting screen 400 is checked, the CPU 32 changes the Low notification flag included in the management information of the target printer from "OFF" to "ON" regardless of whether the target printer is the sub-tank model or the CTG model. At this time, the CPU 32 describes the Low notification remaining rate designated by the administrator in association with the Low notification flag "ON". Further, in a case where the check box 410b (i.e., "Empty notification") in the setting screen 400 is checked, the CPU 32 changes the notification flag(s) corresponding to the ink supply model of the target printer from "OFF" to "ON". Specifically, in a case where the target printer is the sub-tank model, the CPU 32 changes both the Empty CTG notification flag and the Unprintability notification flag included in the management information of the target printer from "OFF" to "ON". In a case where the target printer is the CTG model, the CPU 32 changes the Unprintability notification flag included in the management information of the target printer from "OFF" to "ON".

That is, in a case where the target printer is the sub-tank model and both of the two check boxes 410a, 410b are checked, all of the Low notification flag, the Empty CTG notification flag, and the Unprintability notification flag included in the management information of the target printer are changed from "OFF" to "ON" in S62. In a case where the target printer is the CTG model and both of the two check boxes 410a, 410b are checked, the Low notification flag and the Unprintability notification flag included in the management information of the target printer are changed from "OFF" to "ON".

In a case where the check box 410a (i.e., "Low notification") in the setting screen 400 is not checked, the Low notification flag included in the management information of the target printer is maintained at "OFF". In this case, the Low notification information is not notified to the target printer. In a case where the check box 410b (i.e., "Empty notification") in the setting screen 400 is not checked, the Empty CTG notification flag and the Unprintability notification flag included in the management information of the target printer are maintained at "OFF". In this case, the Empty CTG notification information and the Unprintability notification information are not notified to the target printer. As such, the administrator can select, in the setting screen 400, which of the Low notification information, the Empty CTG notification information, and the Unprintability notification information is/are to be notified. For this reason, the management server 10 can notify the type(s) of notification information desired by the administrator.

In S64, the CPU 32 stores a notification address in the management DB 40. Specifically, in a case where the check box 410a (i.e., "Low notification") in the setting screen 400 is checked, the CPU 32 stores the designated Low notification address in the Low notification address field included in the management information of the target printer. In a case where the check box 410b (i.e., "Empty notification") in the setting screen 400 is checked, the CPU 32 stores the designated Empty notification address in the Empty notification address field included in the management information of the target printer. When S64 ends, the process returns to the monitorings of S10 and S50.

(Management Database Update Process; FIG. 8)

Next, contents of the management database update process executed in S20 of FIG. 6 will be described with reference to FIG. 8. In S100, the CPU 32 selects one piece of printer information from among the one or more pieces of printer information acquired in S12 of FIG. 6. Below, the printer information selected here is called "selected printer information".

In S110, the CPU 32 determines whether the printer name included in the selected printer information (hereinbelow termed "selected printer name") has been stored in the management DB 40. The CPU 32 proceeds to S120 in case of determining that the selected printer name has been stored (YES in S110), while it proceeds to S150 in case of determining that the selected printer name has not been stored (NO in S110).

In S120, the CPU 32 stores each of the number of total sheets, the number of tank sheets, and the number of remaining sheets included in the selected printer information in respective fields of the number of total sheets, the number of tank sheets, and the number of remaining sheets included in the management information that includes the selected printer name (hereinbelow termed "selected management information").

In S122, the CPU 32 determines whether the ink supply model included in the selected management information is the sub-tank model. The CPU 32 proceeds to S124 in case of determining that the ink supply model is the sub-tank model (YES in S122), while it proceeds to S126 in case of determining that the ink supply model is the CTG model (NO in S122).

In S124, the CPU 32 uses the number of total sheets, the number of tank sheets, and the number of remaining sheets included in the selected management information to calculate a total remaining rate, a CTG remaining rate, and a tank remaining rate. Then, the CPU 32 stores the calculated total remaining rate, the calculated CTG remaining rate, and the calculated tank remaining rate respectively in the total remaining rate field. CTG remaining rate field, and tank remaining rate field included in the selected management information.

In S126, the CPU 32 uses the number of total sheets and the number of remaining sheets included in the selected management information to calculate a total remaining rate and a CTG remaining rate. Then, the CPU 32 stores the calculated total remaining rate and the calculated CTG remaining rate respectively in the total remaining rate field and CTG remaining rate field included in the selected management information.

In a case where the total remaining rate was updated in S124 or S126, the CPU 32 determines in S130 whether the total remaining rate after the update is greater than the total remaining rate before the update. Here, the total remaining rate after the update being greater than the total remaining rate before the update means that a new CTG has been mounted in place of the old CTG in the printer having the selected printer name between the previous execution of the process of FIG. 8 and the current execution of the process of FIG. 8. The CPU 32 proceeds to S132 in case of determining that the total remaining rate after the update is greater than the total remaining rate before the update (YES in S130), i.e., in a case where a new CTG has been mounted. On the other hand, in case of determining that the total remaining rate after the update is equal to or below the total remaining rate before the update (NO in S130). i.e., in a case where a new CTG has not been mounted, the CPU 32 skips S132 and proceeds to S140. In a case where the total remaining rate was not updated in S124 or S126, the CPU 32 determines NO in S130 and proceeds to S140.

In a variant, when sending printer information to the management server 10 for the first time after the CTG has been replaced, each of the printers 100a to 100c may send printer information including CTG replacement information to the management server 10. In this case, the CPU 32 determines in S130 whether the selected printer information includes the CTG replacement information, and proceeds to S132 in case of determining that the CTG replacement information is included (YES in S130), while it proceeds to S140 in case of determining that the CTG replacement information is not included (NO in S130). According to this configuration, in each of the printers 100a to 100c, the CPU 32 can appropriately determine whether the CTG has been replaced even in a case where a used CTG that has been used in another printer is mounted instead of a new CTG.

In S132, in a case where any of the three finished flags included in the selected management information indicates "ON", the CPU 32 changes this finished flag from "ON" to "OFF". Since the finished flag is changed to "OFF" as above, the CPU 32 can appropriately notify notification information for the newly mounted CTG. When S132 ends, the process proceeds to S140.

Further, in S150, the CPU 32 stores new management information in the management DB 40. Specifically, the CPU 32 first stores the printer name and the model name included in the selected printer information. Further, the CPU 32 stores the sub-tank model as the ink supply model in a case where the selected printer information includes the number of tank sheets, while it stores the CTG model as the ink supply model in a case where the selected printer information does not include the number of tank sheets. Next, in the case where the ink supply model is the sub-tank model, the CPU 32 stores the number of total sheets, the number of tank sheets, and the number of remaining sheets. On the other hand, in the case where the ink supply model is the CTG model, the CPU 32 stores the number of total sheets and the number of remaining sheets.

S152 to S156 are the same as S122 to S126. In S170, the CPU 32 stores "OFF" for each flag included in the new management information stored in S150. Specifically, in the case where the ink supply model is the sub-tank model, the CPU 32 stores "OFF" for the Low notification flag, the Empty CTG notification flag, and the Unprintability notification flag included in the new management information. On the other hand, in the case where the ink supply model is the CTG model, the CPU 32 stores "OFF" for the Low notification flag and the Unprintability notification flag included in the new management information. In this case, the Empty CTG notification flag and the Empty CTG finished flag are maintained in a blank state. When S170 ends, the process proceeds to S140.

In S140, the CPU 32 determines whether all pieces of the printer information acquired in S12 of FIG. 6 have been selected in S100. In case of determining that all pieces of the printer information have been selected (YES in S140), the CPU 32 ends the process of FIG. 8. On the other hand, in case of determining that not all pieces of the printer information has been selected (NO in S140), the CPU 32 returns to S100, and selects another piece of the printer information.

(Notification Process; FIG. 9)

Next, contents of the notification process executed in S30 of FIG. 6 will be described with reference to FIG. 9. In S200, the CPU 32 selects one piece of management information from among the one or more pieces of management information in the management DB 40. Below, the management information selected here is called "selected management information".

In S210, the CPU 32 determines whether the Low notification flag included in the selected management information is "ON". The CPU 32 proceeds to S212 in case of determining that the Low notification flag is "ON" (YES in S210), while it proceeds to S230 in case of determining that the Low notification flag is "OFF" (NO in S210).

In S212, the CPU 32 determines whether the Low finished flag included in the selected management information is "OFF". The CPU 32 proceeds to S220 in case of determining that the Low finished flag is "OFF" (YES in S212), while it proceeds to S230 in case of determining that the Low finished flag is "ON" (NO in S212). Thus, in the case where the Low finished flag is "ON", i.e., in a case where the Low notification information has been notified, processes of S220 and S222 are not executed. For this reason, it is possible to prevent the Low notification information from being notified plural times in a time period from when the CTG was mounted to when the CTG is replaced. This point is the same for the Empty CTG notification information and the Unprintable notification information, which will be described later.

In S220, the CPU 32 determines whether the total remaining rate included in the selected management information is not greater than the Low notification remaining rate included in the selected management information. The CPU 32 proceeds to S222 in case of determining that the total remaining rate is equal to or below the Low notification remaining rate (YES in S220), while it proceeds to S230 in case of determining that the total remaining rate is greater than the Low notification remaining rate (NO in S220).

In S222, the CPU 32 sends an e-mail indicating the Low notification information to the Low notification address included in the selected management information. The Low notification information includes, e.g., the printer name included in the selected management information, the model name included in the selected management information, and a message indicating that the total remaining rate of the printer has reached the Low notification remaining rate (e.g., "Remaining ink amount in printer has reached 20%.").

In S224, the CPU 32 changes the Low finished flag included in the selected management information from "OFF" to "ON".

S230. S232 are respectively the same as S210. S212 except that the Empty CTG notification flag and the Empty CTG finished flag included in the selected management information are used. In S240, the CPU 32 determines whether the CTG remaining rate included in the selected management information is 0%. The CPU 32 proceeds to S242 in case of determining that the CTG remaining rate is 0% (YES in S240), while it proceeds to S250 in case of determining that the CTG remaining rate is greater than 0% (NO in S240).

In S242, the CPU 32 sends an e-mail indicating the Empty CTG notification information to the Empty notification address included in the selected management information. The Empty CTG notification information includes, for example, the printer name included in the selected management information, the model name included in the selected management information, and a message indicating that the CTG remaining rate of the sub-tank model printer has reached 0% (e.g., "Ink in CTG in sub-tank model printer has been run out. Please replace the CTG.").

In S244, the CPU 32 changes the Empty CTG finished flag included in the selected management information from "OFF" to "ON".

S250. S252 are respectively the same as S210, S212 except that the Unprintability flag and the Unprintability finished flag included in the selected management information are used. In S260, the CPU 32 determines whether the total remaining rate included in the selected management information is 0%. The CPU 32 proceeds to S262 in case of determining that the total remaining rate is 0% (YES in S260), while it proceeds to S270 in case of determining that the total remaining rate is greater than 0% (NO in S260).

In S262, the CPU 32 sends an e-mail indicating the Unprintability notification information to the Empty notification address included in the selected management information. The Unprintability notification information includes, for example, the printer name included in the selected management information, the model name included in the selected management information, and a message indicating that the total remaining rate of the printer has reached 0% (e.g., "Ink in printer has run out, so the printer cannot execute printing. Please replace the CTG.").

In S264, the CPU 32 changes the Empty CTG finished flag included in the selected management information from "OFF" to "ON".

In S270, the CPU 32 determines whether all pieces of the management information in the management DB 40 have been selected in S200. In case of determining that all pieces of the management information have been selected (YES in S270), the CPU 32 ends the process of FIG. 9. On the other hand, in case of determining that not all pieces of the management information have been selected (NO in S270), the CPU 32 returns to S200, and selects another piece of management information.

Figure 10:
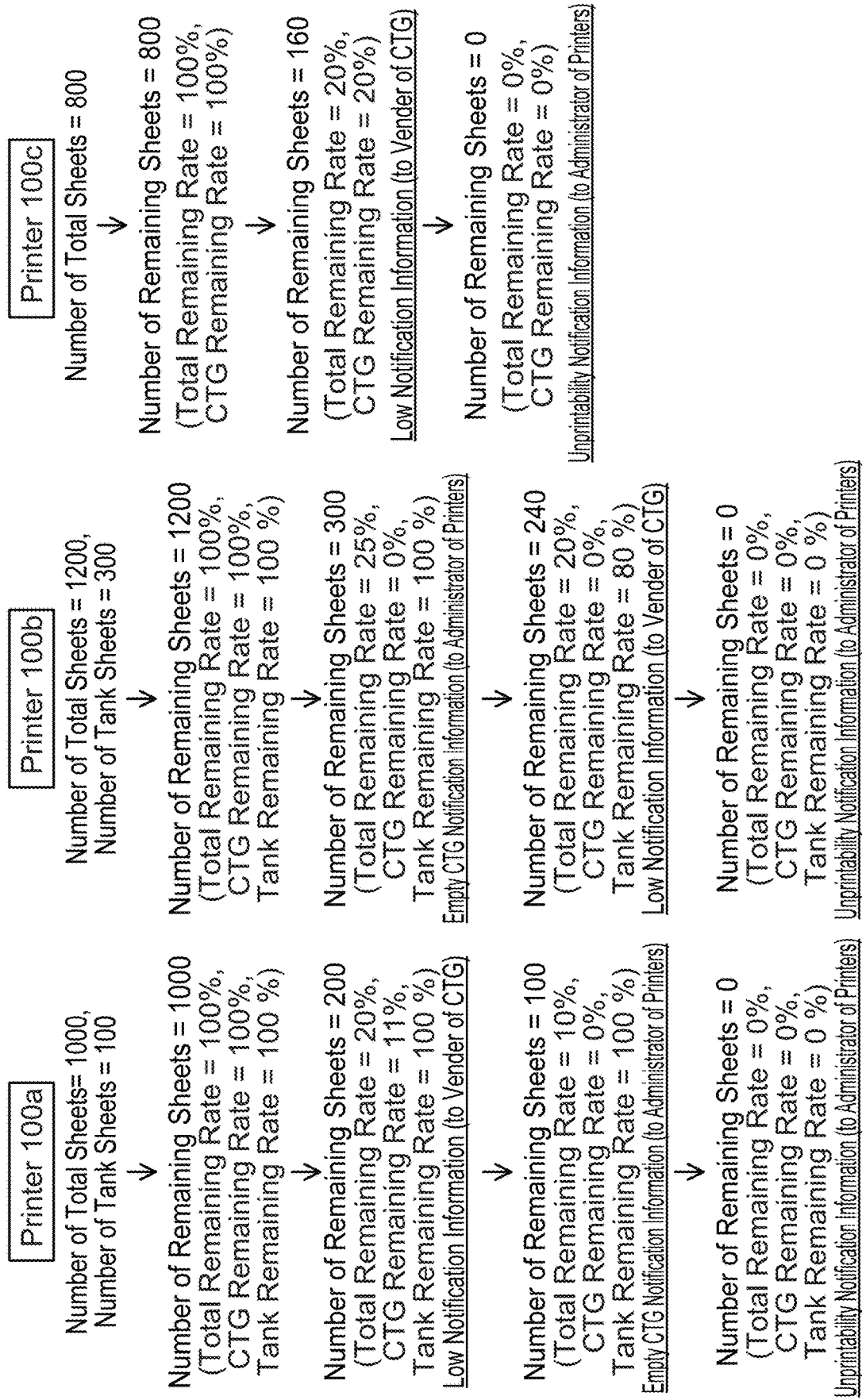
FIG. 10 is an explanatory diagram for describing specific cases.

(Specific Cases; FIG. 10)

Next, specific cases realized by the processes of FIG. 6. FIG. 8, and FIG. 9 will be described with reference to FIG. 10. In the present cases, "ON" has been stored for all the notification flags corresponding to the printers 100a to 100c, and 20% has been stored as a common Low notification remaining rate among the printers 100a to 100c (S62 of FIG. 6). Further, the e-mail address of the CTG vendor has been stored as a common Low notification address among the printers 100a to 100c, and the e-mail address of the administrator has been stored as a common Empty notification address among the printers 100a to 100c (S64).

First, notification related to the sub-tank model printer 100a will be described. The number of total sheets and the number of tank sheets of the printer 100a are 1000 and 100, respectively. When a new CTG is mounted in the printer 100a, the number of remaining sheets of the printer 100a is 1000.

As a result of printing being executed in the printer 100a, the number of remaining sheets becomes 200. In this case, for the printer 100a. 20% is calculated as the total remaining rate (=100×number of remaining sheets 200/number of total sheets 1000), 11% is calculated as the CTG remaining rate (=100×(number of remaining sheets 200−number of tank sheets 100)/(number of total sheets 1000−number of tank sheets 100)), and 100% is calculated as the tank remaining rate (see "the case of RE>TA") (the formula of FIG. 5, S124 of FIG. 8). Since the total remaining rate reaches the Low notification remaining rate 20% (YES in S220 of FIG. 9), the Low notification information is notified to the CTG vendor (S222). For this reason, the CTG vendor can ship a CTG for the printer 100a.

Thereafter, as a result of printing being further executed in the printer 100a, the number of remaining sheets becomes 100. In this case, for the printer 100a. 10% is calculated as the total remaining rate (=100×number of remaining sheets 100/number of total sheets 1000), 0% is calculated as the CTG remaining rate (see "the case of "RE≤TA"), and 100% is calculated as the tank remaining rate (=100×number of remaining sheets 100/number of tank sheets 100) (the formula of FIG. 5. S124 of FIG. 8). Since the CTG remaining rate reaches 0% (YES in S240 of FIG. 9), the Empty CTG notification information is notified to the administrator (S242). For this reason, the administrator can replace the CTG of the printer 100a.

If the CTG of the printer 100a is not replaced after the Empty CTG notification information has been notified to the administrator, the following events can occur. That is, as a result of printing being further executed in the printer 100a, the number of remaining sheets becomes 0. In this case, for the printer 100a. 0% is calculated as the total remaining rate (=100×number of remaining sheets 0/number of total sheets 1000), 0% is calculated as the CTG remaining rate (see "the case of RE 5 TA"), and 0% is calculated as the tank remaining rate (=100×number of remaining sheets 0/number of tank sheets 100) (the formula of FIG. 5. S124 of FIG. 8). Since the total remaining rate reaches 0% (YES in S260 of FIG. 9), the Unprintability notification information is notified to the administrator (S262). For this reason, the administrator can replace the CTG of the printer 100a.

Next, notification related to the sub-tank model printer 100b will be described. The number of total sheets and the number of tank sheets of the printer 100b are 1200, 300, respectively. When a new CTG is mounted in the printer 100b, the number of remaining sheets of the printer 100b is 1200.

As a result of printing being executed in the printer 100b, the number of remaining sheets becomes 300. In this case, for the printer 100b, 25% is calculated as the total remaining rate (=100×number of remaining sheets 300/number of total sheets 1200), 0% is calculated as the CTG remaining rate (see "the case of RE≤TA"), and 100% is calculated as the tank remaining rate (=100×number of remaining sheets 300/number of tank sheets 300) (the formula of FIG. 5. S124 of FIG. 8). Since the CTG remaining rate reaches 0% (YES in S240 of FIG. 9), the Empty CTG notification information is notified to the administrator (S242).

If the CTG of the printer 100b is not replaced after the Empty CTG notification information has been notified to the administrator, the following events can occur. That is, as a result of printing being further executed in the printer 100b, the number of remaining sheets becomes 240. In this case, for the printer 100b, 20% is calculated as the total remaining rate (=100×number of remaining sheets 240/number of total sheets 1200), 0% is calculated as the CTG remaining rate (see "the case of RE 5 TA"), and 80% is calculated as the tank remaining rate (=100×number of remaining sheets 240/number of tank sheets 300) (the formula of FIG. 5, S124 of FIG. 8). Since the total remaining rate reaches the Low notification remaining rate 20% (YES in S220 of FIG. 9), the Low notification information is notified to the CTG vendor (S222). That is, for the printer 100a, the Low notification information is notified first and the CTG notification information is notified later, while for the printer 100b, the CTG notification information is notified first and the Low notification information is notified later.

Thereafter, as a result of printing being further executed in the printer 100b, the number of remaining sheets becomes 0. In this case, for the printer 100b. 0% is calculated as the total remaining rate (=100×number of remaining sheets 0/number of total sheets 1200), 0% is calculated as the CTG remaining rate (see "the case of "RE≤TA"), and 0% is calculated as the tank remaining rate (=100×number of remaining sheets 0/number of tank sheets 300) (the formula of FIG. 5. S124 of FIG. 8). Since the total remaining rate reaches 0% (YES in S260 of FIG. 9), the Unprintability notification information is notified to the administrator (S262).

Next, notification related to the CTG model printer 100c will be described. The number of total sheets of the printer 100c is 800. When a new CTG is mounted in the printer 100c, the number of remaining sheets of the printer 100c is 800.

As a result of printing being executed in the printer 100c, the number of remaining sheets becomes 160. In this case, for the printer 100c, 20% is calculated as the total remaining rate (=100×number of remaining sheets 160/number of total sheets 800), and 20% is calculated as the CTG remaining rate (=100×number of remaining sheets 160/number of total sheets 800) (the formula of FIG. 5, S126 of FIG. 8). Since the total remaining rate reaches the Low notification remaining rate 20% (YES in S220 of FIG. 9), the Low notification information is notified to the CTG vendor (S222). For this reason, the CTG vendor can ship a CTG for the printer 100c.

Thereafter, as a result of printing being further executed in the printer 100c, the number of remaining sheets becomes 0. In this case, for the printer 100c, 0% is calculated as the total remaining rate (=100×number of remaining sheets 0/number of total sheets 800), and 0% is calculated as the CTG remaining rate (=0×number of remaining sheets 0/number of total sheets 800) (the formula of FIG. 5, S126 of FIG. 8). In this case, since the total remaining rate reaches 0% (YES in S260 of FIG. 9), the Unprintability notification information is notified to the administrator (S262). For this reason, the administrator can replace the CTG of the printer 100c.

Effect of First Embodiment

The present embodiment assumes a situation in which there exist the sub-tank model printers 100a. 100b in which ink is supplied from the CTGs 200a. 200b via the sub-tank 175a to the print executing units 160a. 160b, and the CTG model printer 100c in which ink is supplied from the cartridge 200c not via a sub-tank to the print executing unit 160c. In such a situation, for the sub-tank model printers 100a, 100b, the management server 10 notifies the Empty CTG notification information in the case where the CTG remaining rate reaches 0% (S242 of FIG. 9), and notifies the Unprintability notification information in the case where the total remaining rate reaches 0% (S262). Further, for the CTG model printer 100c, the management server 10 notifies the Low notification information in the case where the total remaining rate reaches the Low notification remaining rate (S222), and notifies the Unprintability notification information in the case where the total remaining rate reaches 0% (S262). As above, the management server 10 can notify the different types of notification information depending on the remaining ink amounts in the sub-tank model or the CTG model printers 100a to 100c. In particular, since the management server 10 notifies the Empty CTG notification information, it is possible to notify that the sub-tank model printers 100a, 100b are in a state in which ink is not remaining in the CTGs 200a, 200b and ink is remaining in the sub-tank 175a. Since such novel notification is executed, it is possible to suitably execute notification related to the remaining ink amount in each of the sub-tank model or the CTG model printers 100a to 100c.

Further, as shown in FIG. 10, for the sub-tank model printer 100a, the management server 10 notifies the low notification information in the case where the total remaining rate reaches the Low notification remaining rate (i.e., 20%), and thereafter notifies the Empty CTG notification information in the case where the CTG remaining rate reaches 0%. That is, the Low notification information is notified before the Empty CTG notification information is notified. Consequently, there is a high likelihood that the CTG remaining rate of the printer 100a reaches 0% after the CTG vendor has shipped a new CTG in response to the Low notification information, as a result of which there is a high likelihood that the new CTG has already delivered to the administrator by the time when the CTG remaining rate of the printer 100a reaches 0%. For this reason, the administrator can promptly replace the CTG 200a of the printer 100a in response to the Empty CTG notification information.

(Correspondence Relationships)

The management server 10, the sub-tank model printer 100a, the CTG model printer 100c are respectively examples of "information processing device", "first-type printer", "second-type printer". The print executing unit 160a, the sub-tank 175a, the CTG 200a, the print executing unit 160c, the CTG 200c are respectively examples of "first print executing unit", "tank", "first cartridge", "second print executing unit", "second cartridge". Further, the plurality of printers 100a, 100b is an example of "a plurality of first-type printers".

The ink is an example of "colorant". The ink information 140a, the ink information 140c are respectively examples of "first remaining amount information", "second remaining amount information". The total remaining rate 0% is an example of "unprintable remaining amount". The CTG remaining rate 0% with the total remaining rate being greater than 0% is an example of "first remaining amount". The Low notification remaining rate (e.g., 20%) is an example of "second remaining amount" and "third remaining amount". The Empty CTG notification information is an example of "first notification information". The Unprintability notification information is an example of "second notification information" and "fourth notification information". The Low notification information is an example of "third notification information" and "fifth notification information". The setting screen 400 is an example of "remaining amount designation screen", "notification destination designation screen", and "selection screen". The Empty notification address, the Low notification address are respectively examples of "first notification destination", "second notification destination".

The process of S12 of FIG. 6 is an example of "acquire first remaining amount information" and "acquire second remaining amount information". The process of S52 is an example of "display a remaining amount designation screen", "display a notification destination designation screen", and "display a selection screen". The process of S222 of FIG. 9 is an example of "notify third notification information" and "notify fifth notification information". The process of S242 is an example of "notify first notification information". The process of S262 is an example of "notify second notification information" and "notify fourth notification information".

Second Embodiment; FIG. 11

Next, a second embodiment will be described with reference to FIG. 11. In the present embodiment, contents of the process of S62 of FIG. 6 are different from those of the first embodiment. In the first embodiment, in the case where the target printer is the sub-tank model and both of the two check boxes 410a. 410b in the setting screen 400 of FIG. 7 are checked, all of the Low notification flag, the Empty CTG notification flag, and the Unprintability notification flag included in the management information of the target printer are changed to "ON". By contrast, in the present embodiment, in the aforementioned case, the Unprintability notification flag is changed to "ON", and only one of the Low notification flag and the Empty CTG notification flag is changed to "ON". That is, in the present embodiment, for the sub-tank model printer, only one of the Low notification information and the Empty CTG notification information is notified.

Specifically, in the case where the target printer is the sub-tank model and both of the two check boxes 410a, 410b in the setting screen 400 of FIG. 7 are checked, the CPU 32 first acquires the number of total sheets and the number of tank sheets included in the management information of the target printer from the management DB 40. Then, the CPU 32 calculates a total remaining rate by using a number of remaining sheets that matches the acquired number of tank sheets. For example, in a case where the acquired number of total sheets is 1000 and the acquired number of tank sheets is 100, the CPU 32 calculates a total remaining rate 10% by using the number of remaining sheets 100 that matches the acquired number of tank sheets 100 (=100×number of remaining sheets 100/number of total sheets 1000). Below, the total remaining rate calculated in this manner is called "specific total remaining rate". The specific total remaining rate is a total remaining rate in a state where the CTG remaining rate is 0% and the tank remaining rate is 100%. That is, it is a total remaining rate at a time when the ink in the CTG shifts from a remaining state to non-remaining state.

Next, the CPU 32 determines whether the specific total remaining rate is greater than the Low notification remaining rate. This determination is equivalent to determining which of a timing of notifying the Low notification information and a timing of notifying the Empty CTG notification information arrives earlier in the course of the ink decrease in the printer. In a case where the specific total remaining rate is greater than the Low notification remaining rate. i.e., in a case where the timing of notifying the Empty CTG notification information arrives before the timing of notifying the Low notification information, the CPU 32 changes the Empty CTG notification flag to "ON", and maintains the Low notification flag at "OFF". On the other hand, in a case where the specific total remaining rate is equal to or below the Low notification remaining rate. i.e., in a case where the timing of notifying the Low notification information arrives before the timing of notifying the Empty CTG notification information, the CPU 32 changes the Low notification flag to "ON", and maintains the Empty CTG notification flag at "OFF".

(Specific Cases; FIG. 11)

Next, specific cases realized by the present embodiment will be described. The present cases assume a situation in which the printers 100a to 100c are each a target printer, and both the two check boxes 410a. 410b in the setting screen 400 of FIG. 7 are checked. In this case, for the printer 100a, the specific total remaining rate is equal to or below the Low notification remaining rate, and consequently the Low notification flag and the Unprintability notification flag are "ON", and the Empty CTG notification flag is "OFF" (S62). Further, for the printer 100b, the specific total remaining rate is greater than the Low notification remaining rate, and consequently the Empty CTG notification flag and the Unprintability notification flag are "ON", and the Low notification flag is "OFF" (S62). Other situations are the same as the cases of FIG. 10 of the first embodiment.

As a result of printing being executed in the printer 100a, the number of remaining sheets becomes 200. In this case, for the printer 100a. 20% is calculated as the total remaining rate (=100×number of remaining sheets 200/number of total sheets 1000) (the formula of FIG. 5, S124 of FIG. 8). Since the Low notification flag of the printer 100a is "ON" (YES in S210 of FIG. 9) and the total remaining rate reaches the Low notification remaining rate 20% (YES in S220), the Low notification information is notified to the CTG vendor (S222).

Thereafter, as a result of printing being further executed in the printer 100a, the CTG remaining rate of the printer 100a reaches 0%. However, since the Empty CTG notification flag of the printer 100a is "OFF" (NO in S230 of FIG. 9), the Empty CTG notification information is not notified. This point is different from the case of FIG. 10. Subsequent processes for the case where the total remaining rate of the printer 100a reaches 0% are the same as those for the case of FIG. 10.

Further, as a result of printing being executed in the printer 100b, the number of remaining sheets becomes 300. In this case, for the printer 100b. 0% is calculated as the CTG remaining rate (the formula of FIG. 5, S124 of FIG. 8). Since the CTG notification flag of the printer 100b is "ON" (YES in S230 of FIG. 9) and the CTG remaining rate reaches 0% (YES in S240), the Empty CTG notification information is notified to the administrator (S242).

Thereafter, as a result of printing being further executed in the printer 100b, the total remaining rate of the printer 100b reaches 20%. However, since the Low notification flag of the printer 100b is "OFF" (NO in S210 of FIG. 9), the Low notification information is not notified. This point is different from the case of FIG. 10. Subsequent processes for the case where the total remaining rate of the printer 100b reaches 0% are the same as those for the case of FIG. 10. Further, processes related to the printer 100c are the same as those for the case of FIG. 10.

Effect of Second Embodiment

According to the present embodiment, in a case where the specific total remaining rate is equal to or below the Low notification remaining rate designated by the administrator, the management server 10 notifies the Low notification information, but does not notify the Empty CTG notification information (see the printer 100a of FIG. 11). On the other hand, in a case where the specific total remaining rate is greater than the Low notification remaining rate, the management server 10 notifies the Empty CTG notification information, but does not notify the Low notification information (see the printer 100b of FIG. 11). That is, the management server 10 notifies the notification information corresponding to one of the timings that arrives earlier among the timing of notifying the Low notification information and the timing of notifying the Empty CTG notification information. For this reason, the management server 10 can selectively notify the Low notification information or the Empty CTG notification information depending on the Low notification remaining rate designated by the administrator.

Third Embodiment; FIG. 12

Next, a third embodiment will be described with reference to FIG. 12. In the present embodiment, contents of the setting screen 400 displayed in S52 of FIG. 6 are different from those in the first embodiment. In the present embodiment, only one check box, among the plurality of check boxes 310a to 310c in the management screen 300, can be checked. That is, only one target printer can be selected. When the setting button 330 is selected with one of the check boxes being in the checked state (YES in S50), the CPU 32 displays the setting screen 400 on the display unit 14 (S52).

In a case where the target printer is the sub-tank model and the check box 410b (i.e., "Empty notification") in the setting screen 400 is selected, the CPU 32 calculates a specific total remaining rate of the target printer (see the second embodiment), and additionally displays a message indicating the calculated specific total remaining rate in the setting screen 400. For example, in a case where the target printer is the printer 100a, the CPU 32 displays a message indicating the specific total remaining rate 10%. For example in a case where the target printer is the printer 100b, the CPU 32 displays a message indicating the specific total remaining rate 25%.

In a case where the target printer is the CTG model, the CPU 32 may not additionally display the aforementioned message, or may additionally display a message indicating that the total remaining rate is 0% when the ink in the CTG has run out.

Effect of Third Embodiment

According to the present embodiment, the management server 10 can display a specific total remaining rate (e.g., 10% or 25% of FIG. 12) corresponding to the sub-tank model target printer. Thereby, the administrator can confirm the total remaining rate when the ink in the CTG has run out in the target printer. Thereby, the administrator can designate the Low notification remaining rate corresponding to the specific total remaining rate of the target printer. The administrator can, for example, designate a Low notification remaining rate greater than the specific total remaining rate such that the Low notification information is notified earlier and the Empty CTG notification information is notified later.

(Correspondence Relationships)

The process of displaying the message indicating the specific total remaining rate is an example of "display the first remaining amount". The printer 100*a*, the printer 100*b* are respectively examples of "first printer", "second printer". The specific total remaining rates 10%, 25% are respectively examples of "first value", "second value".

(Variant 1) The management server 10 may notify the Low notification information (S222), in case of determining that the number of remaining sheets is equal to or less than a predetermined number of sheets in S220 of FIG. 9 (YES in S220) instead of using the total remaining rate. Further, the management server 10 may notify the Empty CTG notification information (S242), in case of determining that the number of remaining sheets is equal to or below the number of tank sheets in S240 (YES in S240) instead of using the CTG remaining rate. Further, the management server 10 may notify the Unprintability notification information (S262), in case of determining that the number of remaining sheets is zero in S260 (YES in S260) instead of using the total remaining rate. In the present variant, the predetermined number of sheets, the number of tank sheets, and zero are respectively examples of "second remaining amount (or third remaining amount)", "first remaining amount", "unprintable remaining amount".

(Variant 2) In S12 of FIG. 6, instead of acquiring the number of total sheets TO, the number of tank sheets TA, and the number of remaining sheets RE from each of the printer 100*a*, etc., the management server 10 may acquire, from each of the printer 100*a*, etc., other information related to the remaining ink amount in the printer. For example, each CTG mounted in the printer 100*a*. etc. may comprise a sensor that detects a liquid level in the CTG, and the ink remaining amount in the CTG may be calculated based on this liquid level. Further, the sub-tank model printer 100*a*. etc. may comprise a sensor that detects a liquid level in the sub-tank 175*a*, and the ink remaining amount in the sub-tank 175*a* may be calculated based on this liquid level. In this case, the management server 10 acquires a total amount of ink stored in a new CTG (the unit is. e.g., cc, ml, cm³, etc), an ink remaining amount in the sub-tank 175*a*, and an ink remaining amount in the CTG from each of the sub-tank model printer 100*a*, etc. Further, the management server 10 acquires a total amount of ink stored in a new CTG and an ink remaining amount in the CTG from the CTG model printer 100*c*. According to this configuration as well, the management server 10 can calculate the total remaining rate, the CTG remaining rate and the tank remaining rate, and can execute processes using these remaining rates. Further, in another variant, the sub-tank model printer 100*a*, etc. may be able to calculate the total remaining rate, the CTG remaining rate and the tank remaining rate. Further, the CTG model printer 100*c* may be able to calculate the total remaining rate and the CTG remaining rate. In this case, the management server 10 acquires the total remaining rate, the CTG remaining rate and the tank remaining rate from each of the sub-tank model printer 100*a*, etc. Further, the management server 10 acquires the total remaining rate and the CTG remaining rate from the CTG model printer 100*c*. Generally speaking. "first (or second) remaining amount information" may be any information related to the remaining amount of colorant in the first-type (or second-type) printer.

(Variant 3) In S240 of FIG. 9, the management server 10 may determine whether the tank remaining rate is a predetermined value smaller than 100% (e.g., 90%), instead of determining whether the CTG remaining rate is 0%. In the present variant, the remaining amount in the case where the tank remaining rate is the predetermined value is an example of "first remaining amount".

(Variant 4) The printers 100*a*, etc. may shift from the printable state to the unprintable state in a case where the total remaining rate reaches a predetermined value greater than 0% (e.g., 5%). In the present variant, the remaining amount in the case where the total remaining rate is the predetermined value is an example of "unprintable remaining amount". The unprintable remaining amount of the first-type printer and the unprintable remaining amount of the second-type printer may be the same value (e.g., total remaining rate 0%), or may be different values (e.g., total remaining rate 0% and total remaining rate 5%).

(Variant 5) The processes of S210 to S224 of FIG. 9 may not be executed for the sub-tank model printer 100*a*, etc. That is, the Low notification information may not be notified for the sub-tank model printer 100*a*, etc. In the present variant. "notify fifth notification information" can be omitted.

(Variant 6) The Low notification remaining rate of the management server 10 may not be a value designated by the user, or may be a predetermined value (e.g., 20%, etc.). In this case, the setting screen 400 may not include the remaining amount input field 420. In the present variant. "display a remaining amount designation screen" can be omitted.

(Variant 7) The management server 10 may not notify the respective pieces of notification information by sending e-mails indicating the respective pieces of notification information. For example, the respective pieces of notification information may be notified by displaying the respective pieces of notification information on the management screen 300. In this case, the setting screen 400 may not include the address input fields 430*a*. 430*b*. In the present variant. "display a notification destination designation screen" can be omitted.

(Variant 8) The management server 10 may adopt a configuration in which the respective pieces of notification information are always notified without allowing the user to select whether to notify the respective pieces of notification information. In this case, the setting screen 400 may not include the check boxes 410*a*. 410*b*. In the present variant, "display a selection screen" and "display the first remaining amount" can be omitted.

(Variant 9) The printers 100*a* to 100*c* may comprise a color printing mechanism (e.g., a printing mechanism using four colors of CMYK) instead of the monochrome printing mechanism. In this case, in S12 of FIG. 6, the management server 10 may acquire information (i.e., the number of total sheets, the number of tank sheets, and the number of remaining sheets) corresponding to each color, and may notify notification information corresponding to each color by using the information corresponding to each color.

(Variant 10) The printers 100a to 100c may comprise a laser scheme printing mechanism, instead of the ink jet scheme printing mechanism. In this case, a toner cartridge that stores toner is mounted in each of the printers 100a to 100c. Each of the sub-tank model printer 100a. etc. comprises a sub-tank that stores toner supplied from the toner cartridge to the print executing unit. In the present variant, the toner is an example of "colorant".

(Variant 11) In each of the above embodiments, the respective processes of FIG. 6, FIG. 8, and of FIG. 9 are implemented by software (i.e., the management application 38). However, one or more of the processes may be implemented by hardware such as a logic circuit.

What is claimed is:

1. A non-transitory computer-readable recording medium storing computer-readable instructions for an information processing device,
wherein the computer-readable instructions, when executed by a processor of the information processing device, cause the information processing device to:
acquire first remaining amount information related to a remaining amount of colorant in a first-type printer from the first-type printer, wherein the first-type printer comprises a first print executing unit and a tank configured to store colorant supplied from a first cartridge to the first print executing unit;
acquire second remaining amount information related to a remaining amount of colorant in a second-type printer from the second-type printer different from the first-type printer, wherein the second-type printer comprises a second print executing unit and does not comprise a tank configured to store colorant supplied from a second cartridge to the second print executing unit, and each of the first-type printer and the second-type printer shifts from a printable state to an unprintable state in a case where the remaining amount of colorant in the printer reaches an unprintable remaining amount;
in a case where the acquired first remaining amount information indicates that the remaining amount of colorant in the first-type printer reaches a first remaining amount which is greater than the unprintable remaining amount, notify first notification information indicating that the remaining amount of colorant in the first-type printer reaches the first remaining amount, wherein the first remaining amount is a remaining amount in a state where the colorant does not remain in the first cartridge but remains in the tank;
in a case where the acquired first remaining amount information indicates that the remaining amount of colorant in the first-type printer reaches the unprintable remaining amount, notify second notification information indicating that the remaining amount of colorant in the first-type printer reaches the unprintable remaining amount;
in a case where the acquired second remaining amount information indicates that the remaining amount of colorant in the second-type printer reaches a second remaining amount which is greater than the unprintable remaining amount, notify third notification information indicating that the remaining amount of colorant in the second-type printer reaches the second remaining amount; and
in a case where the acquired second remaining amount information indicates that the remaining amount of colorant in the second-type printer reaches the unprintable remaining amount, notify fourth notification information indicating that the remaining amount of colorant in the second-type printer reaches the unprintable remaining amount.

2. The non-transitory computer-readable recording medium as in claim 1, wherein
the computer-readable instructions, when executed by the processor of the information processing device, further cause the information processing device to:
in a case where the acquired first remaining amount information indicates that the remaining amount of colorant in the first-type printer reaches a third remaining amount which is greater than the first remaining amount, notify fifth notification information indicating that the remaining amount of colorant in the first-type printer reaches the third remaining amount, wherein the third remaining amount is a remaining amount in a state where the colorant remains in the first cartridge.

3. The non-transitory computer-readable recording medium as in claim 2, wherein
the computer-readable instructions, when executed by the processor of the information processing device, further cause the information processing device to:
display a remaining amount designation screen on a display unit of the information processing device, the remaining amount designation screen being for causing a user of the information processing device to designate a desired remaining amount from a predetermined numerical range,
wherein in the case where the acquired first remaining amount information indicates that the remaining amount of colorant in the first-type printer reaches the third remaining amount which is the desired remaining amount designated by the user, the fifth notification information is notified.

4. The non-transitory computer-readable recording medium as in claim 3, wherein
from each of a plurality of first-type printers, the first remaining amount information related to the remaining amount of colorant in the first-type printer is acquired,
for each of the plurality of first-type printers, the first notification information is notified in a case where the acquired first remaining amount information from the first-type printer indicates that the remaining amount of colorant in the first-type printer reaches the first remaining amount,
for each of the plurality of first-type printers, the second notification information is notified in a case where the acquired first remaining amount information from the first-type printer indicates that the remaining amount of colorant in the first-type printer reaches the unprintable remaining amount,
the remaining amount designation screen is for causing the user to designate the desired remaining amount which is common among the plurality of first-type printers, and
for each of the plurality of first-type printers, the fifth notification information is notified in a case where the acquired first remaining amount information from the first-type printer indicates that the remaining amount of colorant in the first-type printer reaches the third remaining amount which is the desired remaining amount designated by the user.

5. The non-transitory computer-readable recording medium as in claim 3, wherein
the remaining amount designation screen is for causing the user to designate the desired remaining amount which is common among the first-type printer and the second-type printer, and
in a case where the acquired second remaining amount information indicates that the remaining amount of colorant in the second-type printer reaches the second remaining amount which is the desired remaining amount designated by the user, the third notification information is notified.

6. The non-transitory computer-readable recording medium as in claim 1, wherein
the computer-readable instructions, when executed by the processor of the information processing device, further cause the information processing device to:
display a remaining amount designation screen on a display unit of the information processing device, the remaining amount designation screen being for causing a user of the information processing device to designate a desired remaining amount from a predetermined numerical range: and
in a case where the first remaining amount is equal to or less than the desired remaining amount designated by the user and the acquired first remaining amount information indicates that the remaining amount of colorant in the first-type printer reaches the desired remaining amount designated by the user, notify fifth notification information indicating that the remaining amount of colorant in the first-type printer reaches the desired remaining amount,
wherein in a case where the first remaining amount is greater than the desired remaining amount, the fifth notification information is not notified,
in a case where the first remaining amount is greater than the desired remaining amount and the acquired first remaining amount information indicates that the remaining amount of colorant in the first-type printer reaches the first remaining amount, the first notification information is notified, and
in a case where the first remaining amount is equal to or less than the desired remaining amount, the first notification information is not notified.

7. The non-transitory computer-readable recording medium as in claim 2, wherein
the computer-readable instructions, when executed by the processor of the information processing device, further cause the information processing device to:
display a notification destination designation screen on a display unit of the information processing device, the notification destination designation screen being for causing a user of the information processing device to designate a first notification destination and a second notification destination,
wherein in a case where the first notification destination and the second notification destination different from the first notification destination are designated in the notification destination designation screen:
the first notification information is notified to the designated first notification destination; and
the fifth notification information is notified to the designated second notification destination.

8. The non-transitory computer-readable recording medium as in claim 7, wherein
in the case where the first notification destination and the second notification destination different from the first notification destination are designated in the notification destination designation screen:
the second notification information is notified to the designated first notification destination;
the third notification information is notified to the designated second notification destination; and
the fourth notification information is notified to the designated first notification destination.

9. The non-transitory computer-readable recording medium as in claim 1, wherein
the computer-readable instructions, when executed by the processor of the information processing device, further cause the information processing device to:
display a selection screen on a display unit of the information processing device, the selection screen being for causing a user of the information processing device to select whether the first notification information is to be notified,
wherein the first notification information is notified in a case where it is selected in the selection screen that the first notification information is to be notified and the acquired first remaining amount information indicates that the remaining amount of colorant in the first-type printer reaches the first remaining amount, and
the first notification information is not notified in a case where it is selected in the selection screen that the first notification information is not to be notified.

10. The non-transitory computer-readable recording medium as in claim 9, wherein
the computer-readable instructions, when executed by the processor of the information processing device, further cause the information processing device to:
display the first remaining amount on the display unit in a case where it is selected in the selection screen that the first notification information is to be notified.

11. The non-transitory computer-readable recording medium as in claim 10, wherein
in a case where it is selected in the selection screen for a first printer that the first notification information is to be notified, a first value is displayed on the display unit as the first remaining amount, the first printer being the first-type printer and having the first value as the first remaining amount, and
in a case where is selected in the selection screen for a second printer that the first notification information is to be notified, a second value is displayed on the display unit as the first remaining amount, the second printer being the first-type printer and having the second value different from the first value as the first remaining amount.

12. An information processing device comprising:
a processor; and
a memory storing computer-readable instructions therein,
wherein the computer-readable instructions, when executed by the processor, cause the information processing device to:
acquire first remaining amount information related to a remaining amount of colorant in a first-type printer from the first-type printer, wherein the first-type printer comprises a first print executing unit and a tank configured to store colorant supplied from a first cartridge to the first print executing unit;
acquire second remaining amount information related to a remaining amount of colorant in a second-type printer from the second-type printer different from the first-type printer, wherein the second-type printer comprises a second print executing unit and does not comprise a tank configured to store colorant supplied from a second cartridge to the second print executing unit, and each of the first-type printer and the second-type printer shifts from a printable state to an unprintable state in a case where the remaining amount of colorant in the printer reaches an unprintable remaining amount;

in a case where the acquired first remaining amount information indicates that the remaining amount of colorant in the first-type printer reaches a first remaining amount which is greater than the unprintable remaining amount, notify first notification information indicating that the remaining amount of colorant in the first-type printer reaches the first remaining amount, wherein the first remaining amount is a remaining amount in a state where the colorant does not remain in the first cartridge but remains in the tank;

in a case where the acquired first remaining amount information indicates that the remaining amount of colorant in the first-type printer reaches the unprintable remaining amount, notify second notification information indicating that the remaining amount of colorant in the first-type printer reaches the unprintable remaining amount;

in a case where the acquired second remaining amount information indicates that the remaining amount of colorant in the second-type printer reaches a second remaining amount which is greater than the unprintable remaining amount, notify third notification information indicating that the remaining amount of colorant in the second-type printer reaches the second remaining amount; and in a case where the acquired second remaining amount information indicates that the remaining amount of colorant in the second-type printer reaches the unprintable remaining amount, notify fourth notification information indicating that the remaining amount of colorant in the second-type printer reaches the unprintable remaining amount.

13. The information processing device as in claim 12, wherein
the computer-readable instructions, when executed by the processor of the information processing device, further cause the information processing device to:
in a case where the acquired first remaining amount information indicates that the remaining amount of colorant in the first-type printer reaches a third remaining amount which is greater than the first remaining amount, notify fifth notification information indicating that the remaining amount of colorant in the first-type printer reaches the third remaining amount, wherein the third remaining amount is a remaining amount in a state where the colorant remains in the first cartridge.

14. The information processing device as in claim 13, wherein
the computer-readable instructions, when executed by the processor of the information processing device, further cause the information processing device to:
display a remaining amount designation screen on a display unit of the information processing device, the remaining amount designation screen being for causing a user of the information processing device to designate a desired remaining amount from a predetermined numerical range,
wherein in the case where the acquired first remaining amount information indicates that the remaining amount of colorant in the first-type printer reaches the third remaining amount which is the desired remaining amount designated by the user, the fifth notification information is notified.

15. The information processing device as in claim 14, wherein
from each of a plurality of first-type printers, the first remaining amount information related to the remaining amount of colorant in the first-type printer is acquired,
for each of the plurality of first-type printers, the first notification information is notified in a case where the acquired first remaining amount information from the first-type printer indicates that the remaining amount of colorant in the first-type printer reaches the first remaining amount,
for each of the plurality of first-type printers, the second notification information is notified in a case where the acquired first remaining amount information from the first-type printer indicates that the remaining amount of colorant in the first-type printer reaches the unprintable remaining amount,
the remaining amount designation screen is for causing the user to designate the desired remaining amount which is common among the plurality of first-type printers, and
for each of the plurality of first-type printers, the fifth notification information is notified in a case where the acquired first remaining amount information from the first-type printer indicates that the remaining amount of colorant in the first-type printer reaches the third remaining amount which is the desired remaining amount designated by the user.

16. The information processing device as in claim 14, wherein
the remaining amount designation screen is for causing the user to designate the desired remaining amount which is common among the first-type printer and the second-type printer, and
in a case where the acquired second remaining amount information indicates that the remaining amount of colorant in the second-type printer reaches the second remaining amount which is the desired remaining amount designated by the user, the third notification information is notified.

17. A method performed by an information processing device, the method comprising:
acquiring first remaining amount information related to a remaining amount of colorant in a first-type printer from the first-type printer, wherein the first-type printer comprises a first print executing unit and a tank configured to store colorant supplied from a first cartridge to the first print executing unit;
acquiring second remaining amount information related to a remaining amount of colorant in a second-type printer from the second-type printer different from the first-type printer, wherein the second-type printer comprises a second print executing unit and does not comprise a tank configured to store colorant supplied from a second cartridge to the second print executing unit, and each of the first-type printer and the second-type printer shifts from a printable state to an unprintable state in a case where the remaining amount of colorant in the printer reaches an unprintable remaining amount;
in a case where the acquired first remaining amount information indicates that the remaining amount of colorant in the first-type printer reaches a first remaining amount which is greater than the unprintable remaining amount, notifying first notification information indicating that the remaining amount of colorant in the first-type printer reaches the first remaining amount, wherein the first remaining amount is a remaining amount in a state where the colorant does not remain in the first cartridge but remains in the tank;

in a case where the acquired first remaining amount information indicates that the remaining amount of colorant in the first-type printer reaches the unprintable remaining amount, notifying second notification information indicating that the remaining amount of colorant in the first-type printer reaches the unprintable remaining amount;

in a case where the acquired second remaining amount information indicates that the remaining amount of colorant in the second-type printer reaches a second remaining amount which is greater than the unprintable remaining amount, notifying third notification information indicating that the remaining amount of colorant in the second-type printer reaches the second remaining amount; and in a case where the acquired second remaining amount information indicates that the remaining amount of colorant in the second-type printer reaches the unprintable remaining amount, notifying fourth notification information indicating that the remaining amount of colorant in the second-type printer reaches the unprintable remaining amount.

18. The method as in claim 17, further comprising:
in a case where the acquired first remaining amount information indicates that the remaining amount of colorant in the first-type printer reaches a third remaining amount which is greater than the first remaining amount, notifying fifth notification information indicating that the remaining amount of colorant in the first-type printer reaches the third remaining amount, wherein the third remaining amount is a remaining amount in a state where the colorant remains in the first cartridge.

19. The method as in claim 18, further comprising:
displaying a remaining amount designation screen on a display unit of the information processing device, the remaining amount designation screen being for causing a user of the information processing device to designate a desired remaining amount from a predetermined numerical range, wherein in the case where the acquired first remaining amount information indicates that the remaining amount of colorant in the first-type printer reaches the third remaining amount which is the desired remaining amount designated by the user, the lifth notification information is notified.

20. The method as in claim 19, wherein
from each of a plurality of first-type printers, the first remaining amount information related to the remaining amount of colorant in the first-type printer is acquired, for each of the plurality of first-type printers, the first notification information is notified in a case where the acquired first remaining amount information from the first-type printer indicates that the remaining amount of colorant in the first-type printer reaches the first remaining amount, for each of the plurality of first-type printers, the second notification information is notified in a case where the acquired first remaining amount information from the first-type printer indicates that the remaining amount of colorant in the first-type printer reaches the unprintable remaining amount, the remaining amount designation screen is for causing the user to designate the desired remaining amount which is common among the plurality of first-type printers, and for each of the plurality of first-type printers, the fifth notification information is notified in a case where the acquired first remaining amount information from the first-type printer indicates that the remaining amount of colorant in the first-type printer reaches the third remaining amount which is the desired remaining amount designated by the user.

* * * * *